(12) United States Patent
Nizar et al.

(10) Patent No.: US 12,224,974 B2
(45) Date of Patent: Feb. 11, 2025

(54) END-TO-END EMAIL TAG PREDICTION

(71) Applicant: Oracle International Corporation, Redwood Shores, CA (US)

(72) Inventors: Naveen Jafer Nizar, Chennai (IN); Kyasaram Vishwa Prasad, Hyderabad (IN); Anilkumar Gande, Hyderabad (IN); Ayushi Behl, Jabalpur (IN); Subir Kawal Hira, San Francisco, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 299 days.

(21) Appl. No.: 17/403,596

(22) Filed: Aug. 16, 2021

(65) Prior Publication Data

US 2021/0377206 A1    Dec. 2, 2021

Related U.S. Application Data

(63) Continuation of application No. 16/707,976, filed on Dec. 9, 2019, now Pat. No. 11,095,600.

(51) Int. Cl.
*H04L 51/234* (2022.01)
*H04L 9/06* (2006.01)
(Continued)

(52) U.S. Cl.
CPC .......... *H04L 51/234* (2022.05); *H04L 9/0643* (2013.01); *H04L 51/08* (2013.01); *H04L 51/18* (2013.01); *H04L 51/42* (2022.05)

(58) Field of Classification Search
CPC ....... H04L 51/34; H04L 9/0643; H04L 51/08; H04L 51/18; H04L 51/22; G06N 3/0454;
(Continued)

(56) References Cited

U.S. PATENT DOCUMENTS 8,239,460 B2 *  8/2012  Meek ............... G06Q 10/10
                                              706/18
8,516,058 B2    8/2013  Stern et al.
(Continued)

FOREIGN PATENT DOCUMENTS

| WO | 2006052618 | 5/2006 |
| WO | 2016144992 | 9/2016 |
| WO | 2018148124 | 8/2018 |

OTHER PUBLICATIONS

International Application No. PCT/US2020/063907, International Search Report and Written Opinion dated Feb. 11, 2021, 12 pages.
(Continued)

*Primary Examiner* — SM A Rahman
(74) *Attorney, Agent, or Firm* — Kilpatrick Townsend & Stockton LLP

(57) ABSTRACT

A system provides automatic, end-to-end tagging of email messages. While a message is being composed at a sending email client, the server may receive email information that is used as an input to a predictive model. The model identifies tags that are available to a specific user group or email list that apply to the email message. These predicted tags are sent back to the email client, where they may be embedded in the email message with other user-defined tags. As the message is passed through the email server, the system may use any changes made to the predicted tags to retrain the model. When the message is received at a second email client, the receiver may further edit the tags, and any changes may again be used to retrain the model.

18 Claims, 20 Drawing Sheets

(51) Int. Cl.
*H04L 51/08* (2022.01)
*H04L 51/18* (2022.01)
*H04L 51/42* (2022.01)

(58) Field of Classification Search
CPC ......... G06N 3/08; G06F 16/26; G06F 16/313; G06F 16/328; G06F 16/358; G06F 16/383; G06Q 10/107
See application file for complete search history.

(56) References Cited

U.S. PATENT DOCUMENTS

| | | | |
|---|---|---|---|
| 9,092,742 B1 | 7/2015 | Zeng et al. | |
| 9,690,870 B2* | 6/2017 | Joshi | G06F 16/901 |
| 10,235,720 B2* | 3/2019 | Abraham | G06Q 40/12 |
| 10,402,493 B2 | 9/2019 | Spencer et al. | |
| 10,496,924 B1 | 12/2019 | Highnam et al. | |
| 11,095,600 B2 | 8/2021 | Nizar et al. | |
| 11,250,364 B2* | 2/2022 | Beznos | G06Q 40/08 |
| 2011/0145354 A1 | 6/2011 | Matsumoto | |
| 2014/0289258 A1 | 9/2014 | Joshi et al. | |
| 2015/0100894 A1* | 4/2015 | Kumar | H04L 67/535 715/752 |
| 2017/0124038 A1 | 5/2017 | Upadhyay et al. | |
| 2017/0228361 A1* | 8/2017 | Zhang | G06F 16/313 |
| 2018/0059884 A1* | 3/2018 | Kim | G06F 3/0482 |
| 2018/0234375 A1 | 8/2018 | Gray et al. | |
| 2019/0079812 A1* | 3/2019 | Karthikeyan | G16C 99/00 |
| 2020/0104225 A1* | 4/2020 | Erickson | G06F 11/321 |

OTHER PUBLICATIONS

U.S. Appl. No. 16/707,976, Final Office Action dated Jan. 6, 2021, 13 pages.
U.S. Appl. No. 16/707,976, Non-Final Office Action dated Aug. 21, 2020, 11 pages.
U.S. Appl. No. 16/707,976, Notice of Allowance dated Apr. 12, 2021, 10 pages.
Application No. PCT/US2020/063907, International Preliminary Report on Patentability, Mailed On Jun. 23, 2022, 8 pages.

* cited by examiner

END-TO-END EMAIL TAG PREDICTION

CROSS-REFERENCE TO RELATED APPLICATIONS

This application is a continuation of U.S. patent application Ser. No. 16/707,976, filed Dec. 9, 2019, entitled "END-TO-END EMAIL TAG PREDICTION," which is incorporated herein by reference in its entirety.

BACKGROUND

Modern Internet and network communications have multiplied exponentially over the past two decades. Members of an organization are now able to communicate instantaneously through a number of different parallel communication channels, including email, instant messaging, text messaging, conversation channels, social media, and/or the like. This communication has led to an increase in the accessibility of information, as well as unprecedented levels of collaboration and teamwork across a distributed workforce. Face-to-face meetings have largely been replaced by electronic communications that are often more efficient, concise, and effective.

Despite the various means of communication that continue to arise, the primary method of business communication remains electronic mail (email) within organizations. Despite the gains in productivity that have been realized as a result of instant email communications, several problems persist that limit the improvements that might otherwise be made. Specifically, with an increasing volume of emails within organizations, users may be required to spend more and more time opening, reading, filing, addressing, and otherwise handling a large volume of email communications that arise each day. Even when limited to a specific organization, such as a few members participating in a group project, the sheer volume of emails received on a daily basis can quickly lead to information overload.

In the past, users receiving emails have used a number of techniques to attempt to organize and mitigate this avalanche of email communications. For example, some email clients allow users to categorize received emails into various folders. Other email clients have used static labels or tags that are manually assigned to classify emails according to particular topics. Some previous solutions have used logical expressions to set up rules that automatically categorize emails as they are received based on word sequences in the subject line or body of the email. However, each of these solutions fails to automatically categorize emails in a consistent way across an organization, and they fail to apply tags in an end-to-end manner from an email sender to an email receiver. This leads to manual category assignments that are different across each of the inboxes in an organization.

SUMMARY

A system provides automatic, end-to-end tagging of email messages. While a message is being composed at a sending email client, the server may receive email information that is used as an input to a predictive model. The model identifies tags that are available to a specific user group or email list that apply to the email message. These predicted tags are sent back to the email client, where they may be embedded in the email message with other user-defined tags. As the message is passed through the email server, the system may use any changes made to the predicted tags to retrain the model. When the message is received at a second email client, the receiver may further edit the tags, and any changes may again be used to retrain the model.

When an email message is drafted at a sending email client, a set of predicted tags may be requested from the system. The email message may be associated with a user group, such as a mailing list or other organizational group, and the group may have its own set of available tags that evolve with the group messages over time. The system can use email information (e.g., body text, subject line, email recipients, etc.) as an input to a model with outputs corresponding to each of the available tags. The model may generate a score for each tag, and a threshold may be used to select a set of predicted tags from the available tags for the group. The sending email client may display the predicted tags in a user interface along with a subject, recipient list, and so forth. The user may then edit the predicted tags, select predicted tags, unselect predicted tags, and/or add new user tags. When adding new tags, the system may provide an auto complete function that matches a typed prefix to the available tags that were not provided as predicted tags.

When the email message is sent, the selected/unselected/user tags may be sent along with the email message. For example, the tags may be embedded in a header of the email message. When the message is received by the email server, the system may again analyze the tags of the email using the model. If no predicted tags were selected/provided, the system may use the email information to generate a set of predicted tags at the email server. These predicted tags may then be added to the email before it is forwarded on to the receiving email client. If new tags were added by the user, or if existing tags were edited by the user, the model can then be retrained using the email information and changed tags as a training pair.

When the email is received by the receiving email client, the receiving user may again use the user interface to edit, add, and/or remove tags that were received with the email message. Once these edits are complete, the system may again use any changes made by the receiving user to generate a new training set for the tag prediction model. This allows tags to be assigned, propagated, and/or edited from the beginning to the end of the lifecycle of an email message. Senders and/or receivers can use a common set of tags such that the categorization of emails can be normalized within a group. The tag prediction model that is trained and utilized for sending emails may also be used to tag messages in additional communication channels, such as Slack® channels, social media feeds, instant messaging, and so forth.

Some implementations of the tag prediction model may generate a word embedding matrix that is populated using the email information. A number of different convolutional filters having different window sizes may each be executed on the columns of the word embedding matrix. The results from the convolutional filters may undergo a max pooling operation to populate a result vector. The model may additionally include a parallel set of operations that also use the word embedding matrix. An attention matrix may be generated from the word embedding matrix, and another max pooling operation may be used to relate specific tags to portions of the input text. The resulting attention vector can be multiplied with a transposed version of the word embedding matrix to generate a second result vector. The two result vectors can then be combined as a fully connected layer to provide the final scores for each of the available tags.

BRIEF DESCRIPTION OF THE DRAWINGS

A further understanding of the nature and advantages of various embodiments may be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION

Described herein are embodiments for implementing a collaborative email tag prediction module for emails and other communication channels. A central server may include a machine learning model that learns to predict tags based on input sets provided to the system. An input set may include email information, such as the text or body of an email, the subject line of an email, attachments to the email, identities of senders/receivers for the email, and so forth. This input text may be analyzed along with information such as a mailing list or group membership. This information may be used to categorize the message into a pre-existing group or organization. This group or organization may have an existing set of organizational tags that can be used to classify messages sent within the organization. Messages can be identified by virtue of their content and classified into a specific group. For example, messages sent over email can be grouped with messages sent through a SLACK® channel, a social media thread, an instant messaging conversation, and so forth. A tag prediction process may use a model that is specific to each group or subgroup, and the model may be continuously trained to refine the predefined tag list and predict tags that are relevant to each message. These tags may be automatically provided to a user when a message is being initially composed. The user may then have the option to add, remove, or modify the suggested tag list. The tag prediction process may provide autocomplete predictions from the predefined list of tags for the organization when the user is making such edits. After the user edits are complete, the changes can be used to further train the model such that it continuously evolves with user preferences over time within the organization. As the email is sent, the server can analyze the tags and identify any differences between what was predicted and what was actually used by the user. Finally, when the email message is received, the receiving user may also add, delete, and/or modify tags in the message, and these changes can again be used to further train the model.

Figure 1:
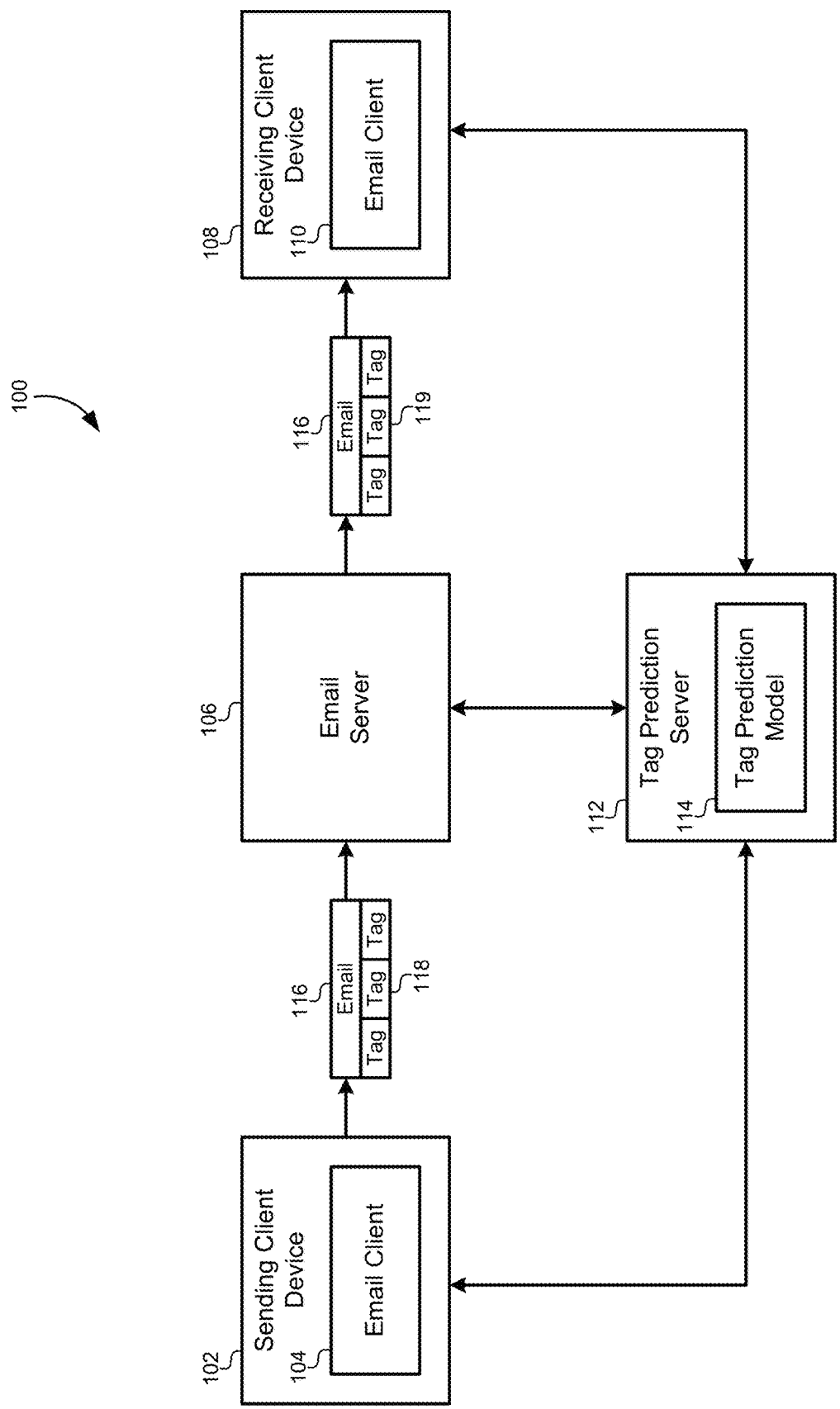
FIG. 1 illustrates a system architecture for implementing dynamic tag prediction, according to some embodiments.

FIG. 1 illustrates a system architecture 100 for implementing dynamic tag prediction, according to some embodiments. The system described herein may be classified as an "end-to-end" tag prediction system in that tags may be predicted and/or refined as a message is composed at the sender, when the messages sent between the sender and receiver, and as the message is read and received by the receiver. This may be contrasted with existing systems that provided tags or other categorization methods that were used exclusively at the sender or the receiver. For example, prior to this disclosure, some email clients allowed users to categorize or tag their emails as they were received. However, no mechanism existed that would allow a tag to be automatically suggested as the message was being composed at the sender, no mechanism existed that predicted tags that were specific to a particular organization or user group, and no mechanism existed that propagated tags from the sender to the receiver such that they were uniform for messages sent throughout an organization.

As described further below, the methods and systems described herein may be applied to any communication channel. More specifically, the methods and systems described herein may be applied across multiple communication channel types such that tags may be shared between communication channels, whether or not they are communicatively compatible. Throughout this disclosure, email messages may be used as a particular example, where email clients at the sender and receiver compose messages that are passed through an email server. A tag prediction server may monitor messages as they are composed, read, and/or sent through the email server to make tag predictions/suggestions and continuously train/refine the models for the group. However, the use of email messages, email clients, and email servers is provided only by way of example and is not meant to be limiting. Other embodiments may freely use any type of communication channel.

The system architecture 100 may include a client device referred to as a sending client device 102. The sending client device 102 may include any digital device capable of sending electronic messages including but not limited to smart phones, digital assistants, laptop computers, desktop computers, tablet computers, smart home devices, virtual/augmented reality devices, and so forth. The sending client device 102 may include an email client 104 comprising a software process that sends/receives messages and provides a user interface through which messages may be composed, read, edited, stored, categorized, and so forth. The email client 104 may be a standalone application (e.g., "app") operating on a smart phone, and application operating on a desktop computer, a browser-based application, and/or any other software process.

The system architecture 100 may also include a receiving client device 108. The receiving client device 108 may also include an email client 110. The receiving client device 108 and/or the email client 110 may be configured as described above for the sending client device 102 and/or the email client 104.

The system architecture 100 may also include an email server 106. The email server (or "mail server") 106 may include any server that handles and delivers email messages over a network. The email server 106 may receive an email message 116 composed and sent from the email client 104 on the sending client device 102. The email server 106 may identify a recipient of the email message 116 and send the email message 116 to the recipient. For example, the email server 106 may forward the email message 116 to the email client 110 on the receiving client device 108. In some embodiments, the email server 106 may also store email messages for each email client 104, 110 such that the email messages may be downloaded by the email client 104, 110 between communication sessions.

The system architecture 100 may also include a tag prediction server 112. The tag prediction server 112 may include a tag prediction model 114. As described in detail below, the tag prediction model 114 may be configured to receive email information, such as the body text of the email message 116, the subject line of the email message 116, the sender/recipient of the email message 116, and/or any other metadata that may be attached to or describe the email message 116. The tag prediction model 114 may analyze the email information and provide at its output a set of suggested tags to be applied to the email message 116. The set of suggested tags may be provided to the email client 104 as the email message 116 is being composed. As described below, the suggested tags may be selected/unselected by the user and/or otherwise modified before the email message 116 is sent. When the email message 116 is sent, a plurality of tags 118 may be embedded as part of the email message 116 as it is transmitted between the sending client device 102 and the email server 106.

When the email message 116 is received at the email server 106, the tag prediction server 112 can review the plurality of tags 118 that were sent from the sending client device 102. The tag prediction server 112 may then identify differences between the tags that were suggested by the tag prediction model 114 and the tags that were selected by the user. The tag prediction server 112 may also identify tags that were added/removed by the user. The tag prediction server 112 may then generate a training pair composed of the email information and the plurality of tags 118. The email information may be used as an input configured to provide the output of the plurality of tags 118 for a training session. Additionally or alternatively, the tag prediction server 112 may also modify the tags 118 that were provided by the sending client device 102. For example, the tag prediction server 112 may add, remove, and/or modify the plurality of tags 118 to generate a modified plurality of tags 119 that are sent with the email message 116 from the email server 106 to the receiving client device 108.

When the email message 116 is received by the email client 110 on the receiving client device 108, the email client 110 may allow the user to view and/or modify the plurality of tags 119 received from the email server 106. In a process similar to what was enabled on the sending client device 102, the receiving client device 108 may allow the user to add tags, remove tags, modify tags, and/or the like. Any changes made to the tags 119 may be transmitted back to the tag prediction server 112 to retrain the tag prediction model 114.

The process illustrated by the system architecture 100 illustrated in FIG. 1 provides the end-to-end tag prediction that solves the technical problems described above. Specifically, the model may be trained for each individual user group. This allows the tags applied to emails sent within the user group to be uniformly maintained throughout the group. Senders and receivers may use a common set of tags that become familiar and uniform throughout the group. Furthermore, the model may be trained over time to be very specific to the language, email habits, terminology, and/or communication styles of users within the group. Additionally, tags may be defined at a sender, modified at a central server, and further refined at a receiver for each email message. Instead of having tags applied at the sender while different tags are applied at the receiver, this system architecture 100 allows tags to be uniformly maintained throughout the lifecycle of an email message. Because the tags are embedded within the email message when it is composed and sent, processed, and/or received, training opportunities are leveraged at each stage as the message is transmitted through the system. Overall, this provides a uniform, predictive, and adaptive tagging system that requires a minimum level of user effort.

Figure 2A:
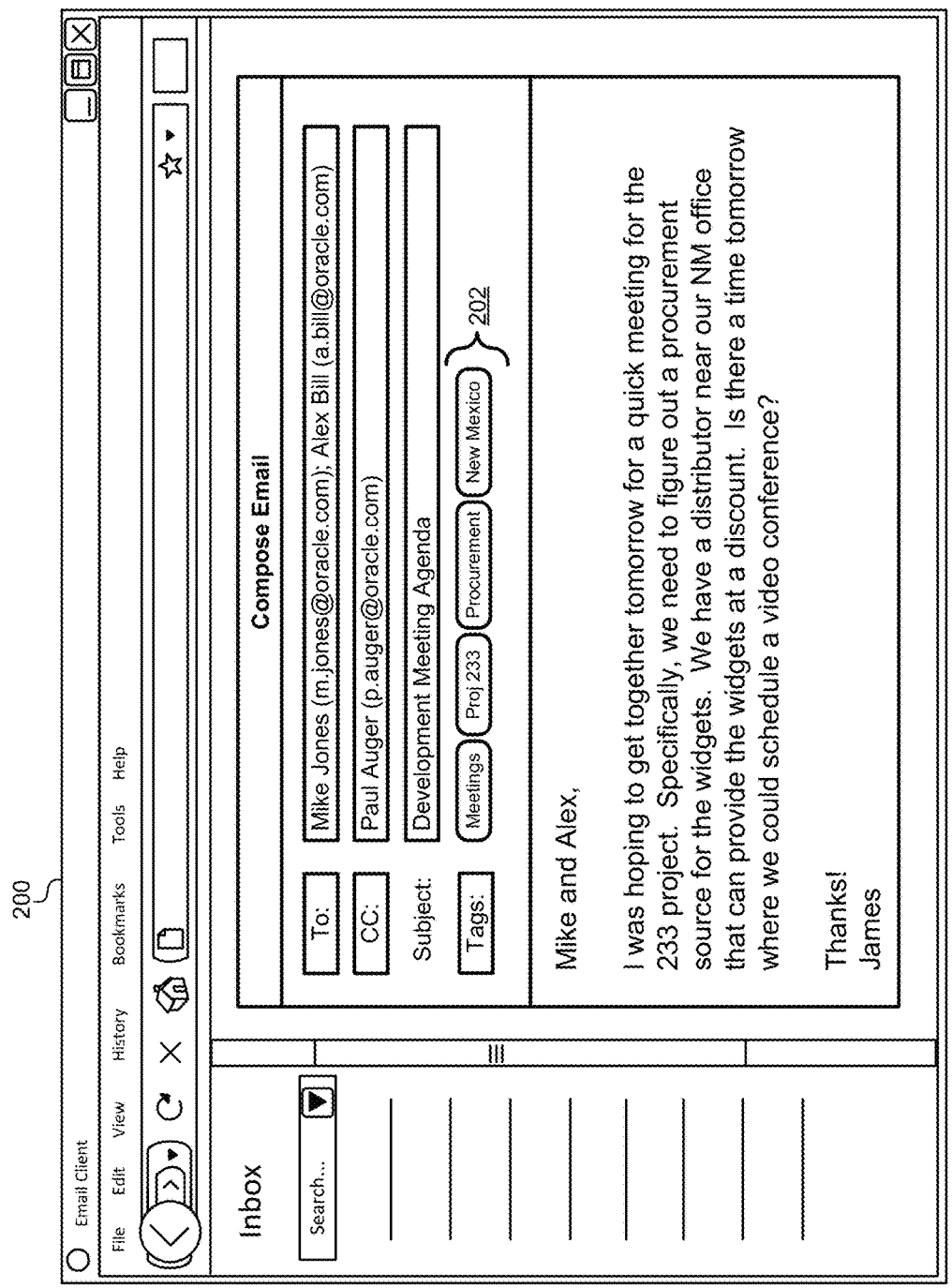
FIG. 2A illustrates a user interface that may be part of the email client at the sending client device, according to some embodiments.

FIG. 2A illustrates a user interface 200 that may be part of the email client 104 at the sending client device 102, according to some embodiments. The interface 200 may include user controls that are typical of modern email clients, such as mailbox organizations (e.g., inbox, sent mail, drafts, etc.), search capabilities, areas for displaying email headers and/or first lines, areas for displaying the body of selected emails, and so forth. In the example of FIG. 2A, the user may have provided an input that produces a display for composing a new email. This display may include fields for specifying email recipients (e.g., "To," "CC," "BCC," etc.), specifying a subject line, and/or providing a body of the email. In some embodiments, the user may also provide a mapping of the email recipients to a mailing list or to a group membership. As described in detail below, the tags applied by the system may be selected from a group of available tags that are specific to a particular mailing list or group membership. The email body may include text, attachments, graphics, multimedia, and/or any other type of digital information that may be embedded and/or attached to email message.

In addition to the traditional displays and user controls that may be provided as part of an email client, the interface 200 may also include an additional control or set of controls that displays and allows a user to edit a set of predicted, selected, and/or user-specified tags for the email message. These tags 202 may be displayed along with the email recipients and subject line of the email message. As described in detail below, the initial tags 202 may be provided automatically from a tag prediction server. As the user composes the email, certain actions may trigger the email client to capture email information, send the email information to the tag prediction server, and receive a set of predicted tags for the email message.

A number of different actions may trigger the system to generate predicted tags. In some embodiments, the email information sent to the tag prediction server may include the subject line, a set of recipients, an email body, any attachments, and/or any other metadata or descriptive information for the email message. When this information is changed, the email information may be sent to the server such that the email information may be processed by the tag prediction model, and a set of predicted tags may be generated. In some embodiments, the tags 202 may be generated each time the email information is changed at the client device. In some embodiments, the tags 202 may be generated at the expiration of a timer (e.g., every 30 seconds, every 60 seconds, and so forth. In some embodiments, the tags 202 may be generated when the email message is completed (e.g., when the user clicks "send"). When the set of predicted tags 202 are received from the tag prediction server, they may be displayed in the tags field as illustrated in FIG. 2A.

The tags 202 may be indicative of subjects addressed by the email message. For example, the message being composed in the interface 200 may relate to certain predefined tags that have been previously assigned to this particular user group. For example, the email message may relate to "Meetings" as it requests a videoconference. It also may relate to "Proj 233" as its mentions this particular project in the email body. The message may also relate to "Procurement" as it requests procurement options for a particular widget. Finally, the message may relate to "New Mexico" as it references a distributor at this location. Each of these tags may have been automatically predicted using the tag prediction model from a set of global tags assigned to this group. These tags 202 may serve as a starting point for the user to refine the tags that will ultimately be applied to this email message.

Figure 2B:
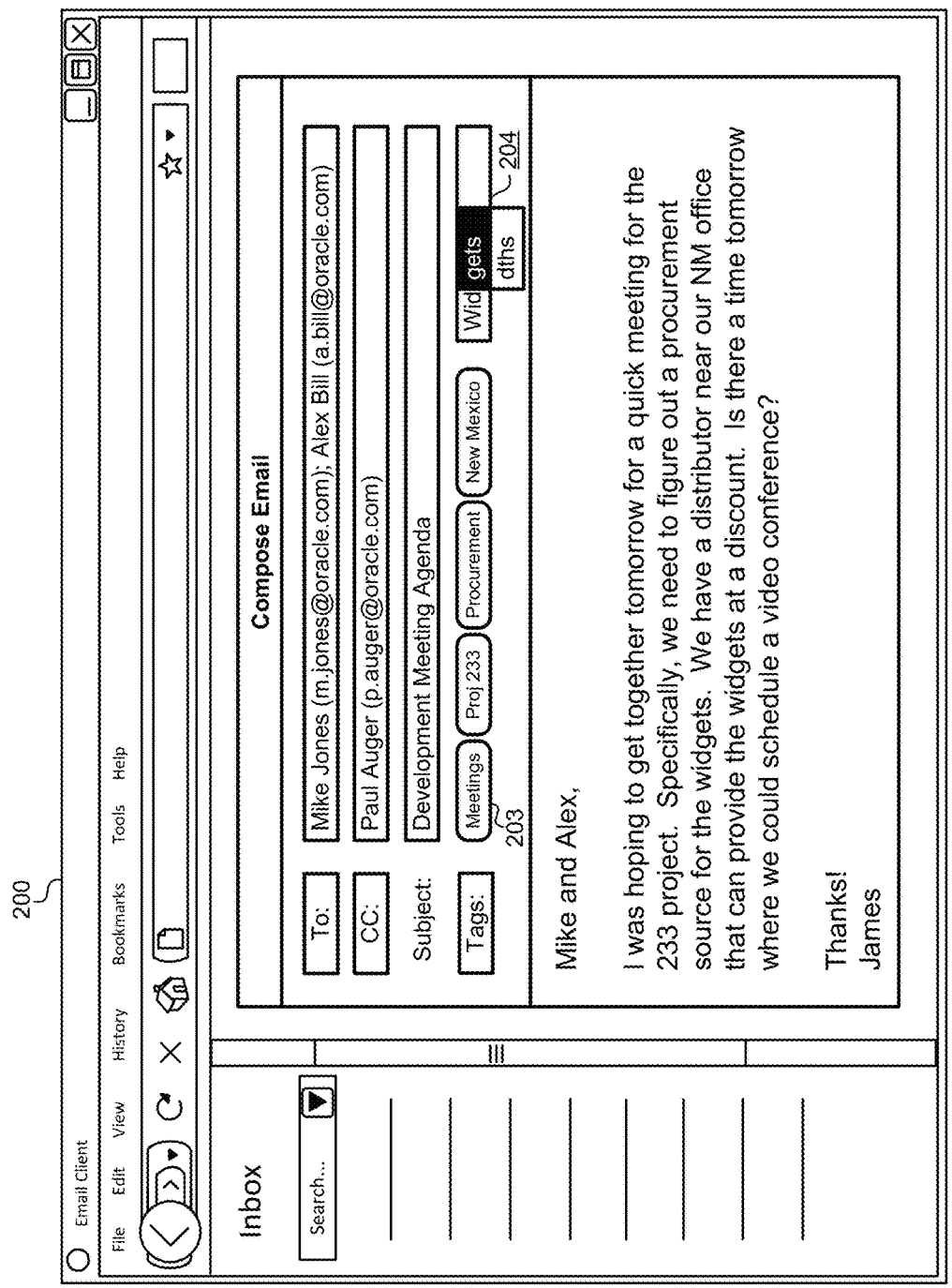
FIG. 2B illustrates how the user interface may be used to add new tags and remove existing tags, according to some embodiments.

FIG. 2B illustrates how the user interface 200 may be used to add new tags and remove existing tags, according to some embodiments. After receiving the set of predicted tags 202 as a starting point, the user may wish to further refine the tags that are assigned to the email message. A control 204 may be provided such that users may enter text representing new tags to be applied to the current email message. In some embodiments, the system may provide an auto complete function that helps steer users into existing tags for the particular user group.

As described in detail below, the server may choose its initial set of predicted tags from a set of global tags that are available to this user group. Each of these available tags may correspond to an output of the tag prediction model. However, the output of the model may generate a score for each of the available tags, and the server may only send tags with a score above a certain threshold. This ensures that the predicted tags are related to the particular email message by virtue of a minimum confidence score. The remaining available tags that were scored below the minimum confidence score are still available as tags that may be applied to the current email message, even though they were not initially predicted to be applicable.

As the user begins to type information into the control 204, the system may perform an auto complete function that first references tags in the available tag list that were not selected as predicted tags by the tag prediction server. In this example, as the user begins typing the text "Wid . . . " the system may search the list of available tags that were not selected as predicted tags and identify any of the remaining available tags that match the prefix typed by the user. For example, the control 204 may provide text that finishes or auto completes the text being typed by the user, such as the "Widgets" and "Widths" tags from the available tag list. The user can then select one of the auto complete options rather than manually typing the rest of the text for the tag.

In some embodiments, the system may allow the user to add new tags that are not part of the available tag list. The auto complete function illustrated by the control 204 may provide auto complete options. If the user continues to type such that the typed prefix no longer matches any of the available tags, the system may define a new tag added by the user. As described below, this new tag may be added to the list of available tags for the user group when the model is retrained. Additionally, the user may delete or "unselect" one or more of the predicted tags provided by the tag prediction server. In this example, the user may wish to remove the "Meetings" tag 203 from the list. The user may feel that this tag is unnecessary or has been incorrectly assigned to this particular email message. The user may simply click the tag 203 and delete the tag from the list.

Figure 2C:
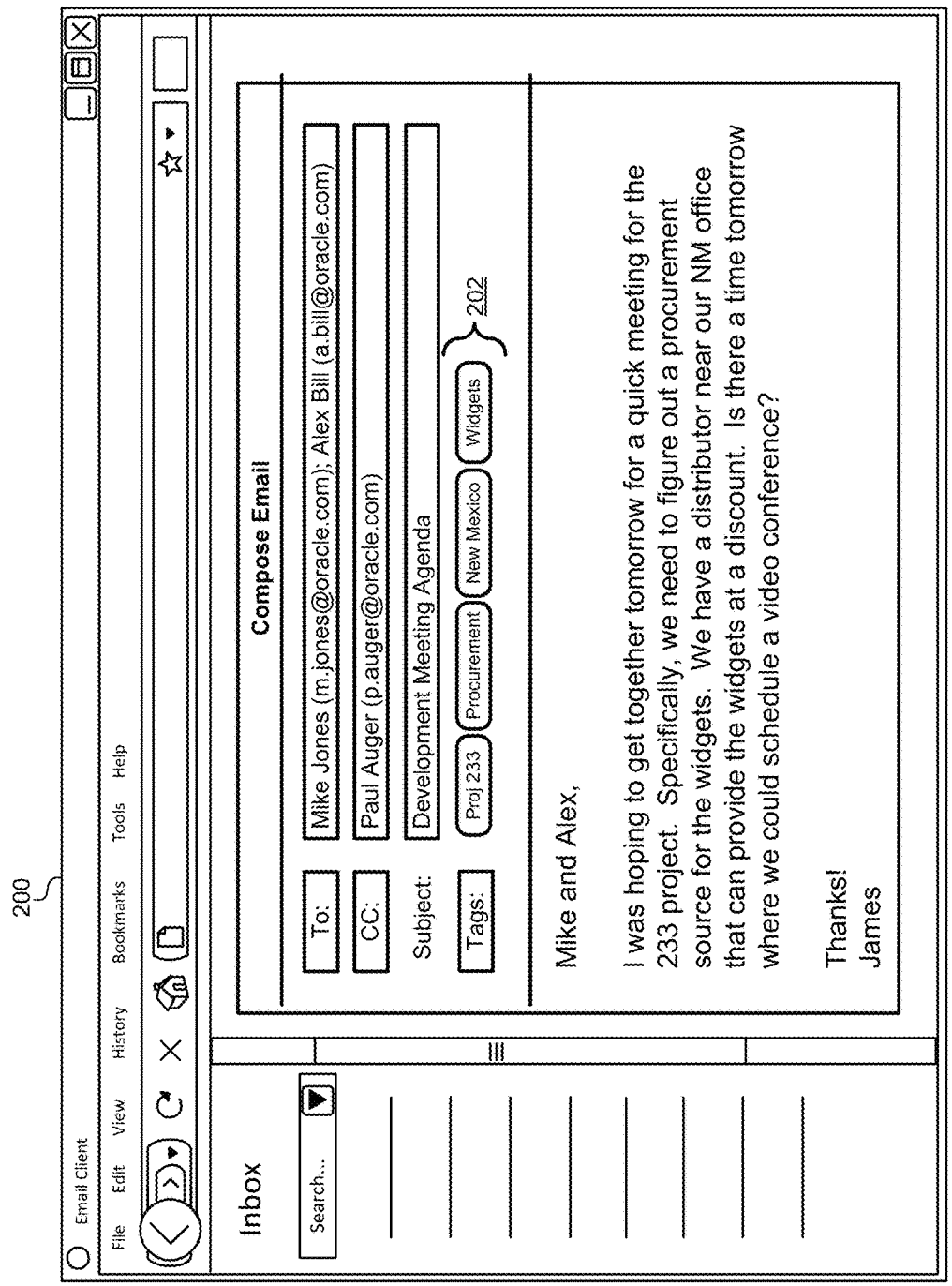
FIG. 2C illustrates the user interface after user changes have been made to the list of tags 202, according to some embodiments.

FIG. 2C illustrates the user interface 200 after user changes have been made to the list of tags 202, according to some embodiments. As described above, the original list of predicted tags illustrated in FIG. 2A has been changed by adding the "Widgets" tag and removing the "Meetings" tag. When tags are removed from the list of predicted tags provided by the server, they may be referred to as unselected tags (i.e., tags originally provided in the predicted tag list that were not selected by the user as applicable to this email message), while any tags that remain from the predicted list of tags may be referred to as selected tags (i.e., tags originally provided in the predicted tag list that were selected by the user as applicable to this email message). Additionally, any tags that are added by the user, either manually or through the auto complete feature, may be referred to as user tags. This terminology may distinguish between tags that are added by the user that were not initially predicted by the model and tags that were saved/removed from the list that were initially predicted by the model.

Figure 2D:
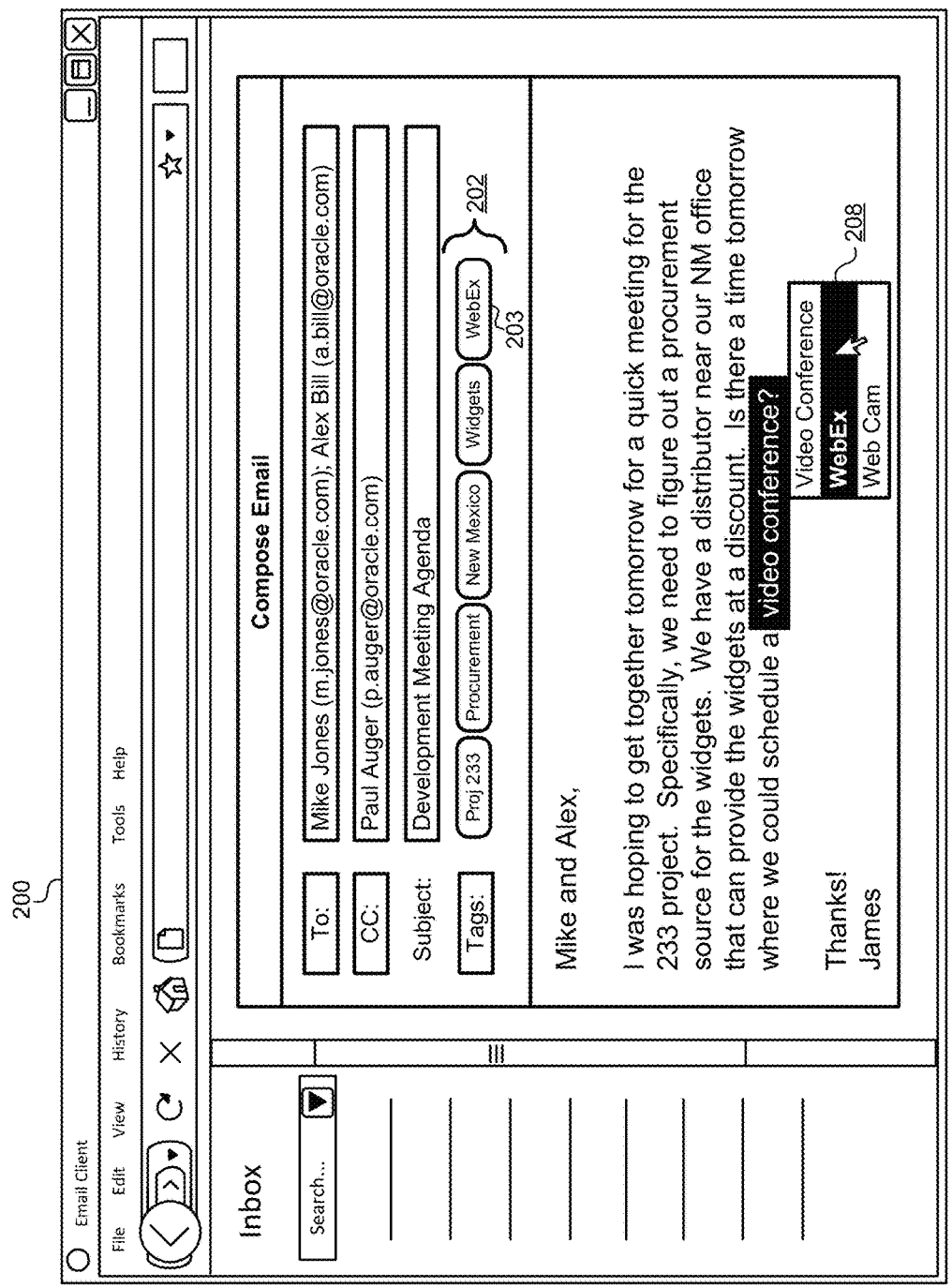
FIG. 2D illustrates how the user interface may be used to apply a tag to a specific text selection, according to some embodiments.

FIG. 2D illustrates how the user interface 200 may be used to apply a tag to a specific text selection, according to some embodiments. In the example described above, the entirety of the email information may be analyzed by the model, and the predicted tags provided by the model may have been applicable to the entire email message. However, some embodiments may allow a more fine-grained association between tags and text segments within an email message.

In this example, the user may highlight a specific segment of text, such as the "video conference" text string in the body of the email message. In response to highlighting or selecting this text string, the interface 200 may generate a pop up control 208 that allows the user to select one of the available tags from the tag prediction server for this user group. In some embodiments, the selected text may be sent to the tag prediction model and a new set of predicted tags specific to that text selection may be provided. In this example, the tag prediction model may provide a set of tags that are applicable to this particular text selection, including tags such as "Video Conference," "WebEx," and/or "Web Cam." As described above for the auto complete feature, the user may select one of the predicted tags from the control 208 to be applied to that specific text selection. Additionally, if the desired tag is not available in the control 208, the user may type a new tag that may be added to the group of available tags for this user group or mailing list. The auto complete feature may be activated as the user types the new tag such that an available tag may be provided that is not initially displayed as a suggested tag in the control 208. Thus, new tags may be added using either the auto complete feature or by typing an entirely new tag as described above in relation to FIG. 2B. After the tag is selected, an icon for a tag 203 may be added to the tags 202 in the tag list of the interface 200. When the user clicks on the tag 203, the "Video Conference" text may be highlighted in the interface 200 such that the connection between the tag 203 and the specific selected text is visually apparent.

Figure 3:
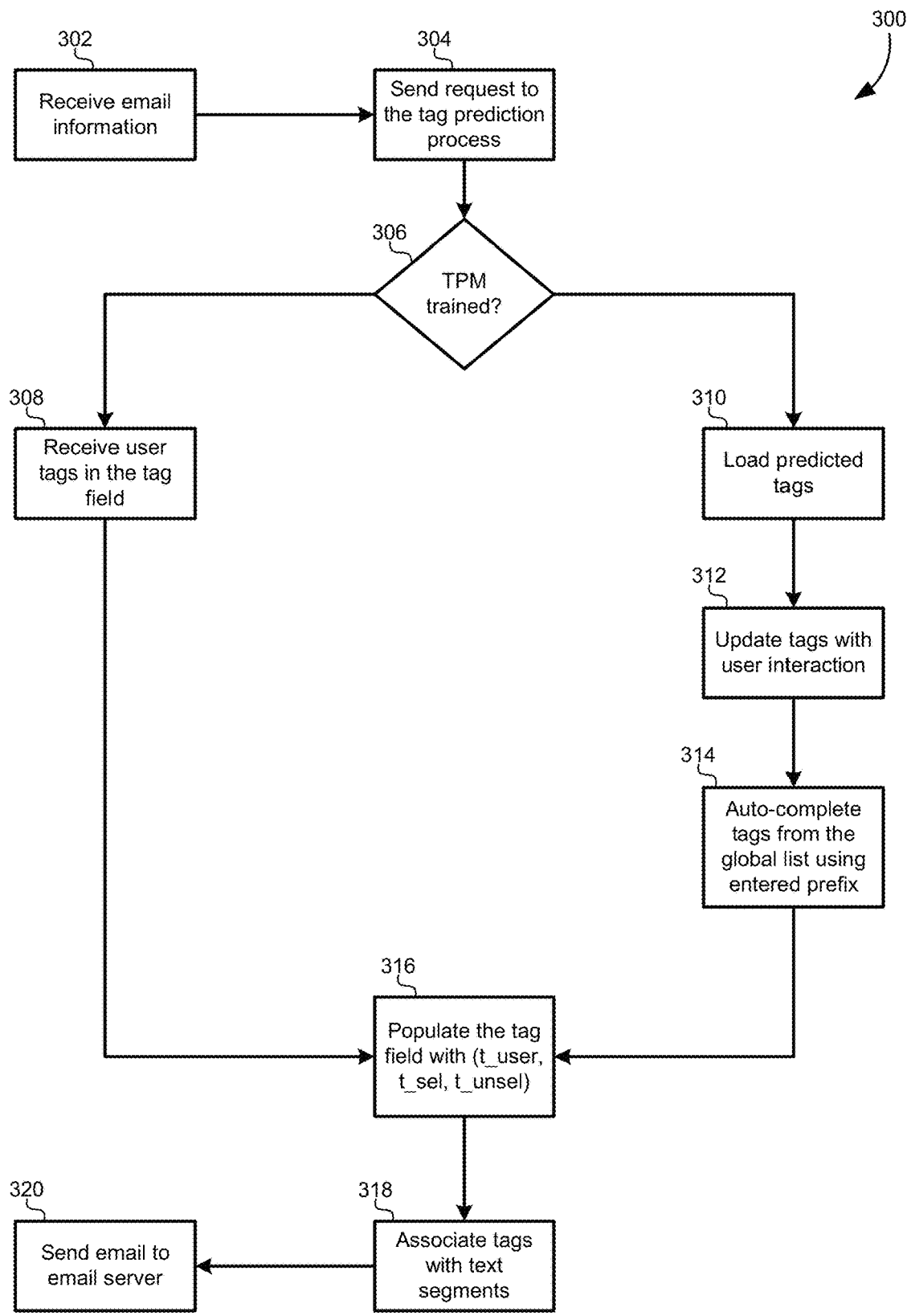
FIG. 3 illustrates a flowchart of a process performed by an email client to display a set of predicted tags for editing by user, according to some embodiments.

FIG. 3 illustrates a flowchart 300 of a process performed by an email client to display a set of predicted tags for editing by user, according to some embodiments. The method may include receiving email information (302). The email information may be loaded automatically or provided by a user as the email is composed. For example, the user may provide a subject line, a set of recipients, an attachment, a body of the email, and so forth. As the email information is provided by the user, the information may then be provided to the tag prediction server (304).

In some embodiments, the tag prediction model may need to be sufficiently trained before it can be used to reliably predict tags from the email information. The model may be trained manually using a set of training data. The model may also be trained during use as emails are sent through the system. A determination may be made as to whether the tag prediction model is enabled, operating, and/or sufficiently trained to generate a reliable, predicted set of tags (306). The model may be considered trained after a predetermined number of training data sets have been processed, after a predetermined time interval has expired, and so forth.

If the model has not yet been trained, the system may proceed without providing a set of predicted tags as a starting point for the user. However, the interface may still allow the user to add their own tags for each email message. As illustrated in FIG. 3, these user tags may be specified using the shorthand of "t_user" to specify tags that are entered by the user. These tags may be new to the system, or these tags may be selected from available tags that were not previously predicted. In some embodiments, as new user tags are provided to the system, the outputs of the model may be updated such that the set of available tags grows based on how new tags are added.

If the model has previously been sufficiently trained, then the model may provide a set of predicted tags from the set of available tags as described below. The user interface may load the set of predicted tags (310) such that they are displayed with the email as it is being composed in real time. As described above, the interface may allow the user to update the tag list such that new tags are added to the list, existing tags are removed ("unselected") from the list, and so forth (312). Additionally, the auto complete function described above may interface with the tag prediction server to provide auto complete options that are taken from the global list of available tags for the particular user group (314).

After user tags have been added and predicted tags have been selected/unselected, a final list of tags may be presented to populate the tag field in the email before it is sent (316). This final set of tags transmitted from the email client of the sending client device may include the user tags (t_user), the tags that remain selected from the predicted tag list (t_sel), and/or the tags that were removed/unselected from the predicted tag list (t_unsel). Optionally, some tags may be associated with a particular text selection (318). Any tags not associated with particular text selections may be considered generally applicable to the email information.

The method may also include sending the email to the email server (320). Some embodiments may modify a traditional email structure that existed prior to this disclosure to add additional fields for the tags. Specifically the t_user, t_sel, and t_unsel tags may all be included in the header of the email such that they are all available to the server. This tag structure indicates how an initial set of predicted tags from the tag prediction model were modified by the user. Differences between these two tag sets may be used to train the model such that the model adapts to user preferences over time. Additionally, tags that are associated with specific text selections may include the tag text as well as start/end references within the email information that defined the text selection.

Figure 4:
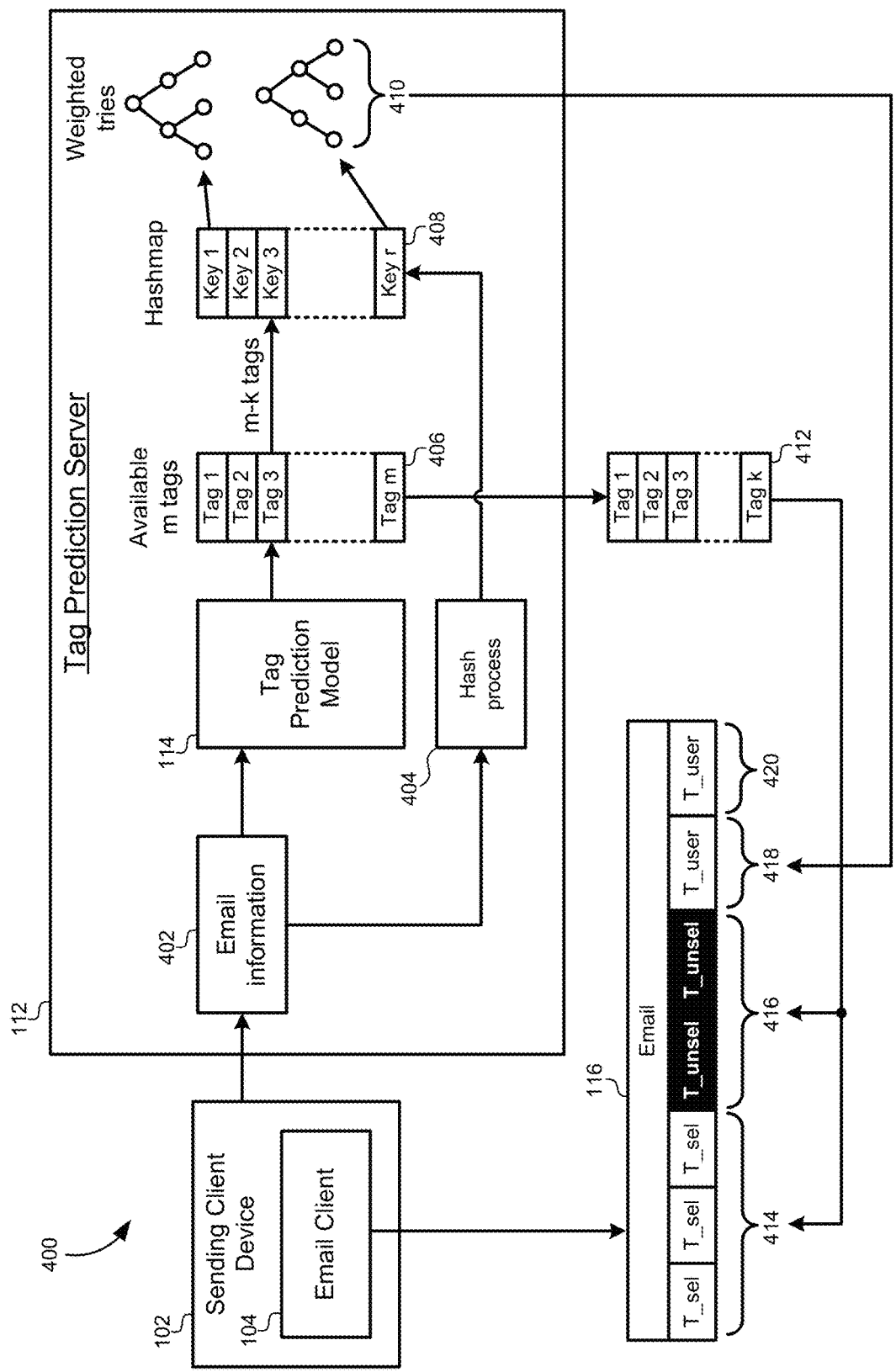
FIG. 4 illustrates a functional diagram of the operations performed by the tag prediction server to generate a set of predicted tags from a set of available tags, according to some embodiments.

FIG. 4 illustrates a functional diagram 400 of the operations performed by the tag prediction server to generate a set of predicted tags from a set of available tags, according to some embodiments. This diagram 400 illustrates how the sending client device 102 interacts with the tag prediction server 112 as an email is being composed and sent. The email client 104 may send the email information 402 described above to the tag prediction server 112. The email information 402 may be provided as an input to the tag prediction model 114. The tag prediction model 114 may have a plurality of outputs, each of which corresponds to a single available tag in the system. When an input set of email information 402 is provided to the tag prediction model 114, the outputs corresponding to each of the available tags may generate a confidence score. For example, the confidence score may include a decimal value between 0.0 and 1.0. The confidence score may increase as the associated available tag is more closely correlated with the email information 402. The particular details of how the tag prediction model 114 operates are described in detail below in FIGS. 8-11.

In this example, the number of available tags 406 in the system may include m tags. Instead of providing all m available tags 406, the system may apply a threshold to the confidence scores provided by the tag prediction model. A number k of the available tags 406 that exceed the confidence score threshold may be provided as predicted tags 412 to the email client 104. The number k of predicted tags 412 may be less than the number m of available tags 406. The predicted tags 412 may be initially displayed as tags for the email information as described above in relation to FIG. 2A. The user may choose to keep some of the predicted tags 412, which may be referred to as selected tags 414. The user may also choose to remove some of the predicted tags 412, which may be referred to as unselected tags 416. Both the selected tags 414 and the unselected tags 416 may be embedded in the email message when it is sent.

The tag prediction model 114 may be specific to a particular user group, such as an organization or sub organization within an operating environment. For example, different tag prediction models 114 may be trained for different project groups. Different tag prediction models 114 may be trained for different organizations according to an org chart. Different tag prediction models 114 may be trained for different user roles or security authorization groups. In one common example, the different tag prediction models 114 may be trained for specific mailing lists. As users organizations may establish mailing lists, a specific tag prediction model 114 may be trained for each mailing list such that each mailing list develops its own set of available tags that evolve over time to meet the needs of the members of the mailing list. In short, the tag prediction model 414 may be trained to be specific to any grouping of users.

Because the tag prediction model may facilitate a number of requests at the same time, some embodiments may include a memory mechanism that saves the state of the available tags for each email message. Additionally, individual users may compose multiple email messages at the same time. Therefore, the email information 402 may be provided to a hash process 404. The hash process may create unique keys based on any portion of the email information 402. To accommodate multiple emails from the same sender, the hash process 404 may use the sender email ID, the subject of the email, the mailing list, the timestamp, portions of the email body, and/or any other information in combination to generate a unique hash key for each email to populate a hash map 408. The hash map 408 may include hash keys for each open email message using the particular tag prediction model 114.

The hash map 408 may map to a representation of the available tags for each open email message. These may be represented as individual weighted tries generated based on the remaining m-k available tags. A trie is a special version of a tree data structure where each node corresponds to a portion of a prefix, and a tag may be constructed by traversing a path in the trie. The trie may be weighted such that certain paths are more heavily weighted than others. These weights may be determined based on the confidence score derived from the tag prediction model 114.

Recall that these tags may be made available for the auto complete feature described above. For example, when the user begins typing in the pop-up window at the email client 104, the system may request auto complete entries as the tag is created. For example, the email information 402 may be provided to the hash process 404, which may generate a key corresponding to the open email message. The hash map 408 may receive the key generated by the hash process 404 and retrieve the corresponding weighted trie 410 associated with the open email message. The email message 116 may then include user tags 418 generated by the auto complete feature, as well as any user tags 420 that were added from scratch by the user.

When the user sends the email message 116, each of the tag types 414, 416, 418, 420 described above may be embedded as part of a header in the email message 116. Additionally, the email information 402 may be provided to the hash process 404 such that the corresponding key in the hash map 408 and the corresponding weighted trie 410 may be purged from the memory system.

Figure 5:
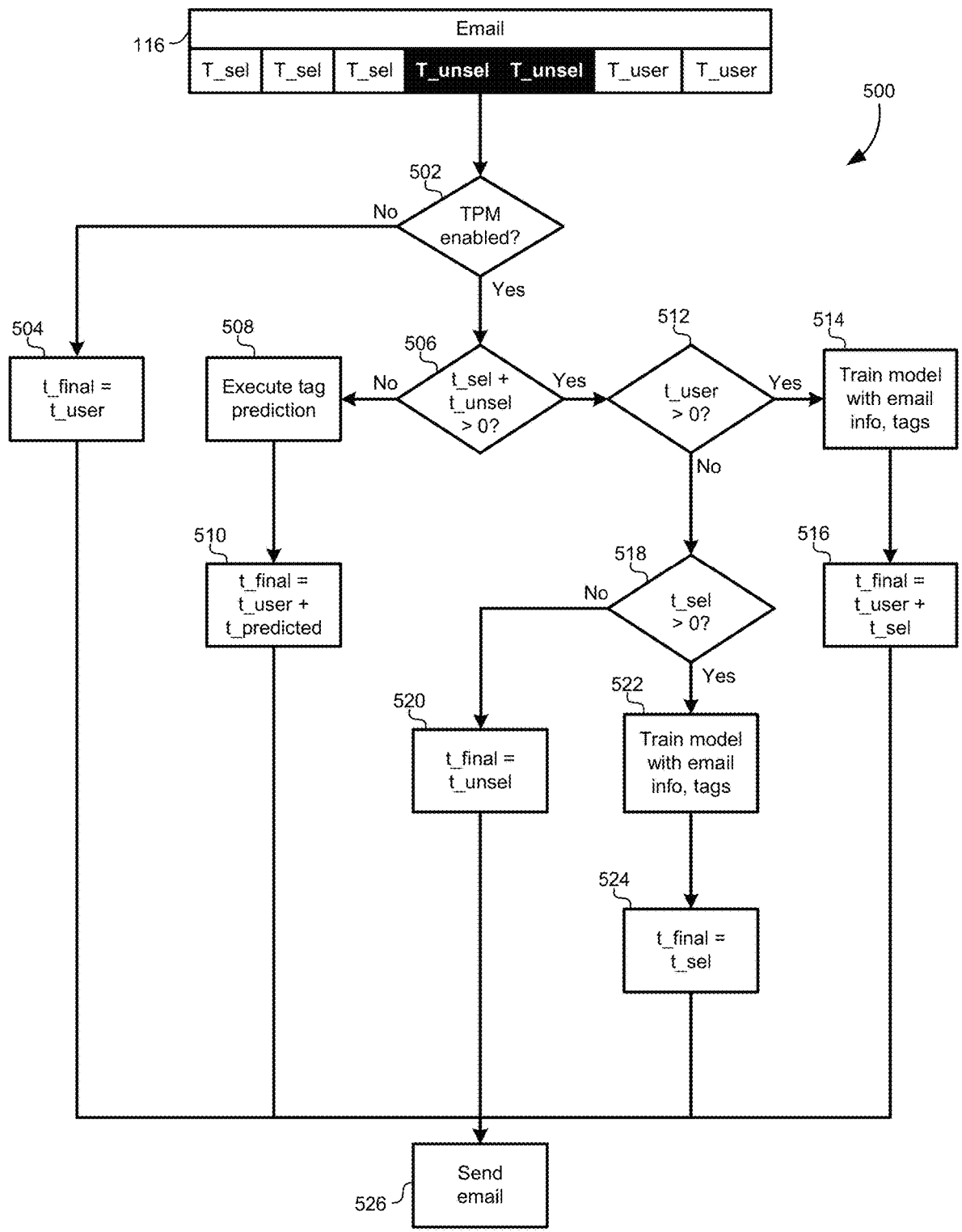
FIG. 5 illustrates a flowchart of a method for processing tags in an email message as it is sent through the email server, according to some embodiments.

FIG. 5 illustrates a flowchart 500 of a method for processing tags in an email message as it is sent through the email server, according to some embodiments. As described above in FIG. 1, when the email is received by the email server 106, the email server 106 may send the email information and/or the tags to the tag prediction server 112. The tag prediction server may then execute this method to update the tags in the email message and/or to further train the tag prediction model.

The method may include first determining whether the tag prediction model is enabled (502). If the model is not enabled, then no further processing on the tags and/or email information may be needed. Any tags embedded in the email message may be considered user tags that were manually added by the user since the tag prediction model was not active. The user tags may be assigned as the final tags for the email message (504), and the tag prediction server 112 may send an indication to the email server 106 that the email message 116 may be delivered to the receiving client device 108 (526). In some embodiments, the user tags may be used as a training data set with the email information to train the tag prediction model and/or to build a set of available tags for the user group.

If the tag prediction model is enabled (i.e., sufficiently trained), then a determination may be made as to whether any predicted tags were provided to the email client when the email message was being composed (506). For example, if the number of selected tags added to the number of unselected tags is greater than 0, then predicted tags were provided to the email client and initially presented as a starting point for the user. If no predicted tags were provided, then an assumption may be made that the tag prediction model was not available when the message was being composed. For example, the tag prediction model may have been unavailable due to a network outage, software or client updates, model training, and so forth. Therefore, some embodiments may execute the tag prediction process at this time (508). This may generate a set of predicted tags that can be added to the set of user tags provided with the email message. For example, any tags added by the user may be combined with tags predicted by the tag prediction model, and the union of these two tag sets may be stored as the final tags for the email message (510). The set of predicted tags may then be embedded in the email header along with the user tags, and the email may be sent with the updated set of tags (526).

More commonly, a determination may be made that predicted tags were provided to the email client when the email message was being composed (506). Next, a determination may be made as to whether the user added any additional tags to the set of selected/unselected tags predicted by the tag prediction model (512). If user tags were provided, then this may indicate that the model needs to be retrained to more closely match the user preference/behavior. A training pair may be constructed using the email information and a combination of the user tags and the predicted tags (514). This training pair can then be provided to the tag prediction model during a future training session. The final tag set for the email can be set as the user tags and the selected tags (516), and the email may be sent with this final set of tags (526).

If no user tags were added when the email message was composed (512), then a determination may be made as to whether the user opted to keep any of the predicted tags, i.e., whether the number of selected tags is greater than 0 (518). If there are no selected tags, indicating that none of the predicted tags were kept by the user, then an assumption may be made that the user has not reviewed the predicted tags. In some embodiments, the user may be required to affirmatively select tags from the predicted tag list before they are used as tags for the email. In this case, the system may not benefit by discarding the unselected tags. Instead, the final tags that may be set as the unselected tags (520). Essentially, the system may assign all of the predicted tags to the email if none of them are selected by the user. This may indicate that the user did not sufficiently review the predicted tags, and thus this lack of an affirmative selection by the user need not be used to train the model.

If selected tags are assigned to the email message, then the selection of tags may be used to further train the model. This helps the model adjust the confidence threshold and/or adjust the confidence scores generated by the model such that future predicted tag sets are more likely to align with the selected tag sets chosen by the user. In other words, this training set makes it more likely that users will select all of the predicted tags as applicable to the email message in the future. A training pair may be defined using the email information and the set of selected tags (522) and used to train the model during a future training session. The final set of tags for the email message may be set as the selected tags for the user (524), and the email message may be sent with this final set of tags (526).

This process illustrates why some embodiments may embed the unselected tags in the email header along with the selected tags. Even though the unselected tags do not necessarily apply to the email message as indicated by the user, they may still be used by this process initiated by the email server. Without storing the unselected tags an email header, they may not be available for this process to further train the model.

Figure 6:
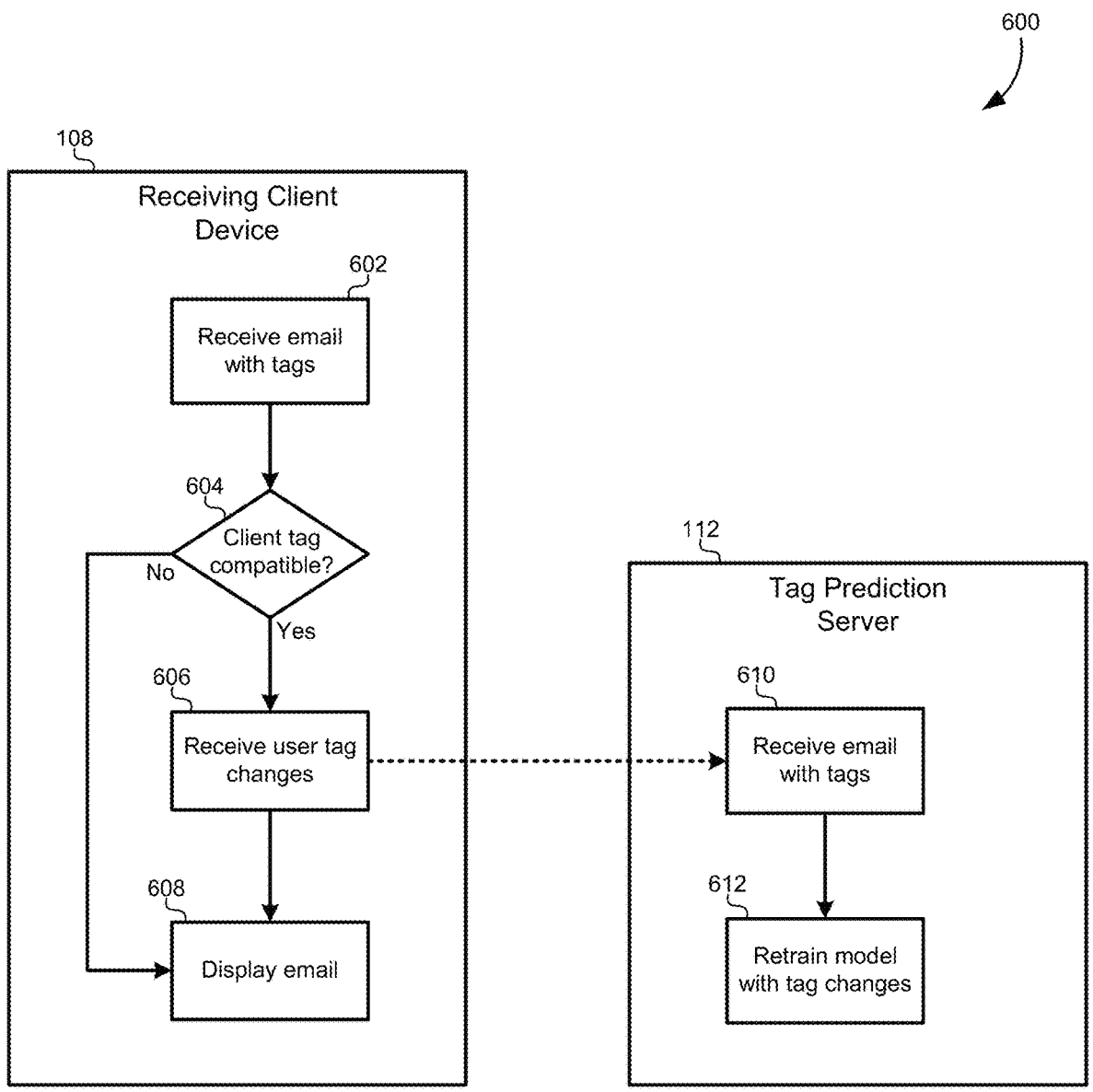
FIG. 6 illustrates a flowchart of a method for interacting with tags using a receiving client device, according to some embodiments.

FIG. 6 illustrates a flowchart 600 of a method for interacting with tags using a receiving client device 108, according to some embodiments. This process may be very similar to the process described above in FIG. 3 for the sending client device. In this case, the receiving client device 108 may receive an email with a set of tags (602). A determination may be made as to whether the email client is compatible with the tagging system described above (604). If the email client is not compatible, then the tag information in the header may be discarded and/or otherwise not displayed in the user interface, and the email may be displayed as normal without the tags (608). This may ensure that emails sent from a system that is tag-compatible are still backwards compatible with other email clients/systems that do not use this tagging system.

If the email clients is compatible with the tag system (604), then the tags may be displayed in a user interface as illustrated below in FIGS. 7A-7C, and the user may make modifications, additions, and/or subtractions from the current tag set (606). It should be noted that the tags initially presented to the receiving email client may have been initially predicted by the tag prediction model, selected/unselected by the sending user, augmented with auto complete and/or other user-generated tags, and sent through the email server. At the email server, the tag prediction server may again be accessed and the tags may be further refined to include additional predicted tags as described above.

When the tags are received by the receiving email client, the receiving user may make further modifications to the tag set. For example, the receiving user may add tags, remove tags, modify existing tags, and/or otherwise change the tag list. This may include using the auto-complete functionality described above to select a new tags from the existing available tag list for this particular user group. After the tags are changed by the receiving user, the receiving client device 108 may send the received email with the altered tags back to the tag prediction server 112 (610). The tag prediction server 112 may then retrain the model with the changes made to the tags by the receiving client device 108 (612). Thus, the model may be retrained based on changes made at the sending client device 102, the email server 106, and/or the receiving client device 108 to provide end-to-end management of a common set of tags assigned to each email message passing through the system.

Figure 7A:
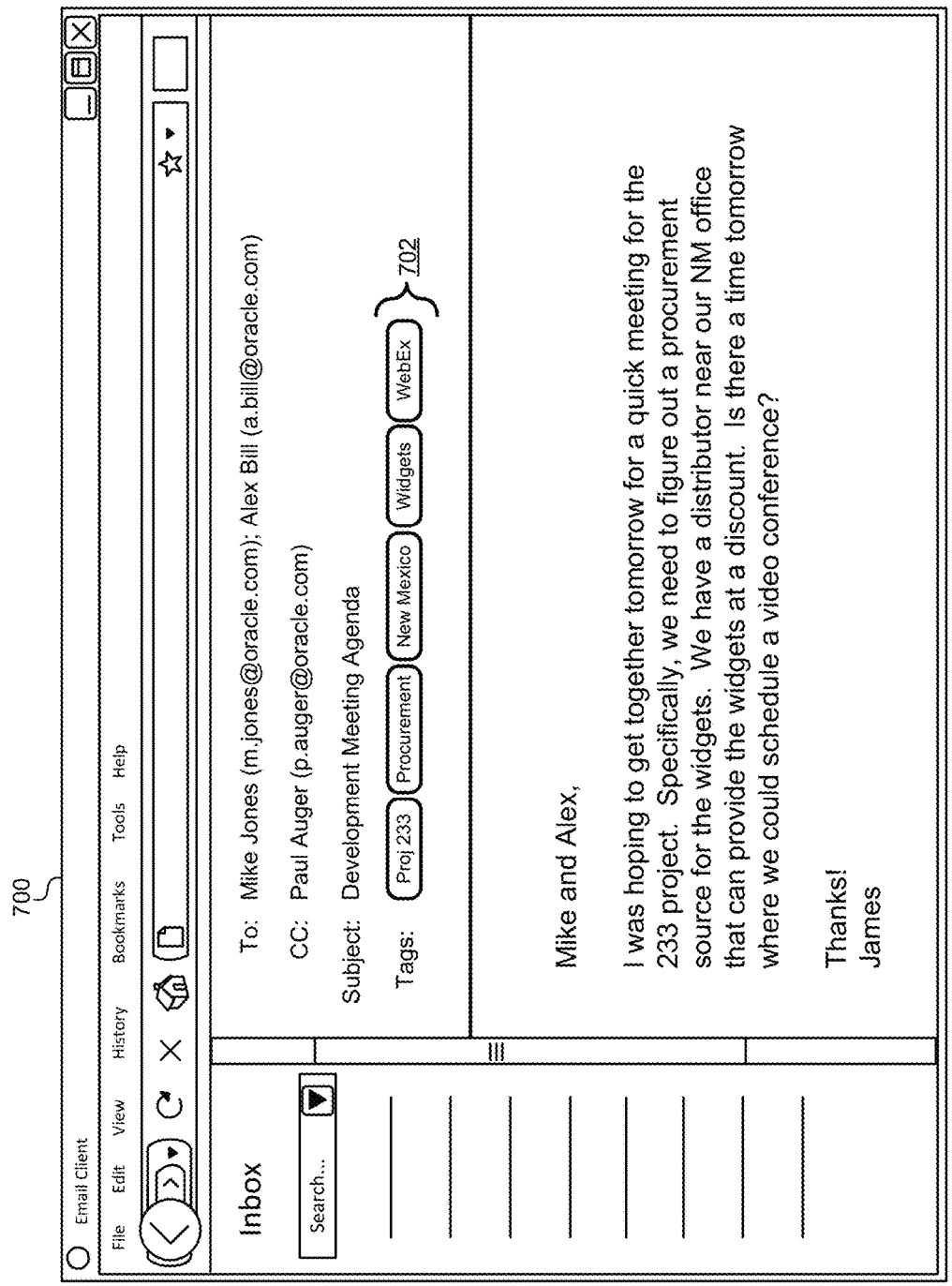
FIG. 7A illustrates a user interface implemented at the receiving email client, according to some embodiments.

FIG. 7A illustrates a user interface 700 implemented at the receiving email client, according to some embodiments. The user interface 700 may include any of the common features described above in relation to FIG. 2A. The user interface 700 may allow the user to select an email from a list of emails in their inbox and display the contents of the email in a display area illustrated in FIG. 7A. As part of this display area, the email may display the recipient list, the sender, the subject, and/or other traditional email information. Additionally, when the email client is compatible with the tag system, the received email may also display a field with the tags 702 that were previously assigned by the sending email client and/or by the tag prediction server as the email was being composed and/or sent through the email server. These tags 702 may serve as a starting point for the receiving user to view and/or edit the tags 702 for the email.

Figure 7B:
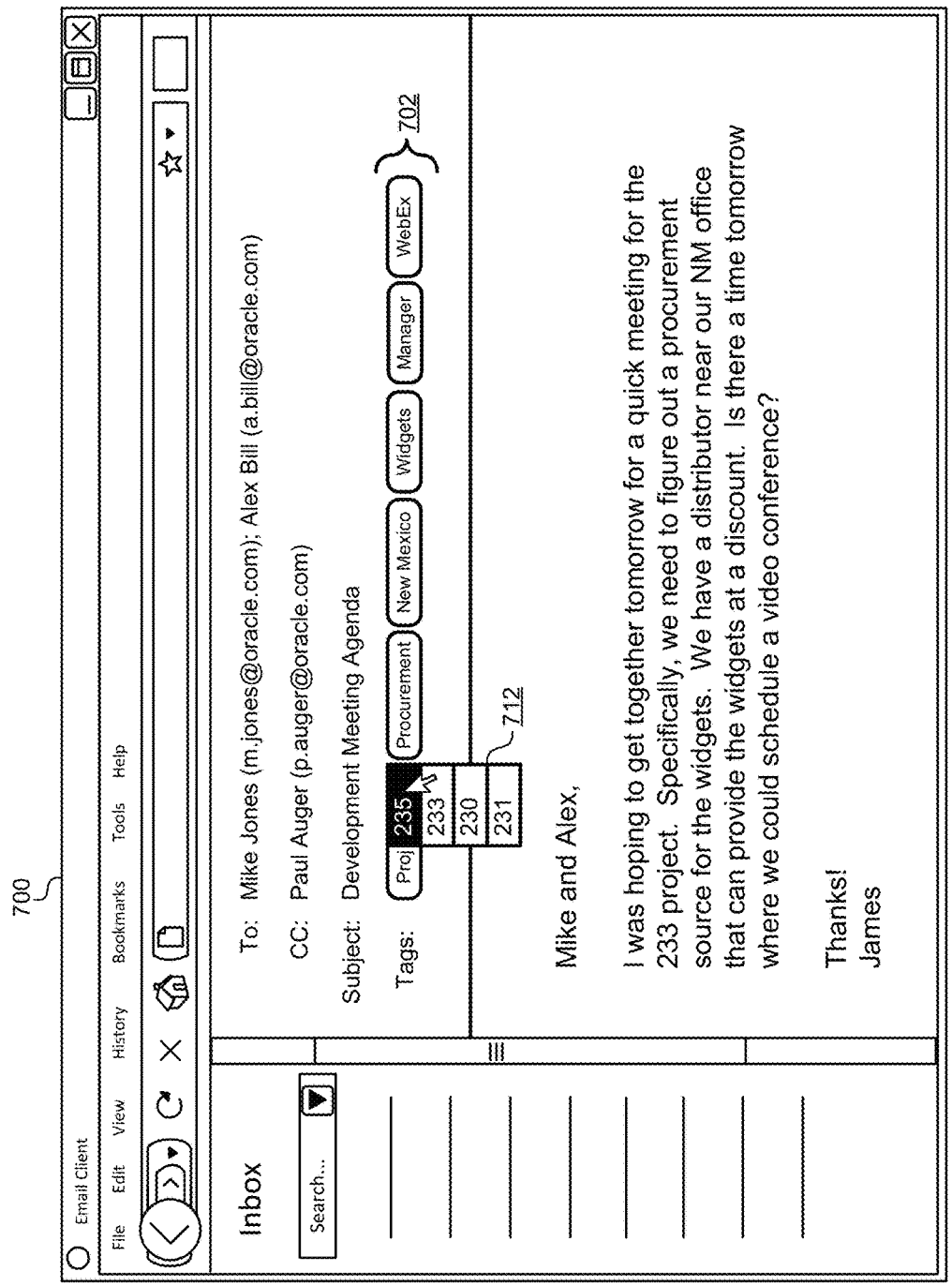
FIG. 7B illustrates how the user interface may be used to modify the set of tags according to some embodiments.

FIG. 7B illustrates how the user interface 700 may be used to modify the set of tags 702 according to some embodiments. Essentially, the same process may be followed at the receiving email client as was described above for the sending email client to edit, add, and/or remove tags from the set of tags 702. For example, the receiving user may realize that the sending user incorrectly identified the project to which this email should apply, i.e., this email should apply to project 235 instead of project 233. The user may select the tag for "Proj 233" and delete the "3" suffix portion of the tag. At this point, the email client may send a request to the tag prediction server to provide an auto complete list based on the prefix left in the tag. For example, other projects starting with "23" may be displayed in a drop down menu 702 that may be presented to the user. Additionally, although not shown explicitly in FIG. 7B, the user may add new user tags and/or remove any existing tags that were part of the received email message.

Figure 7C:
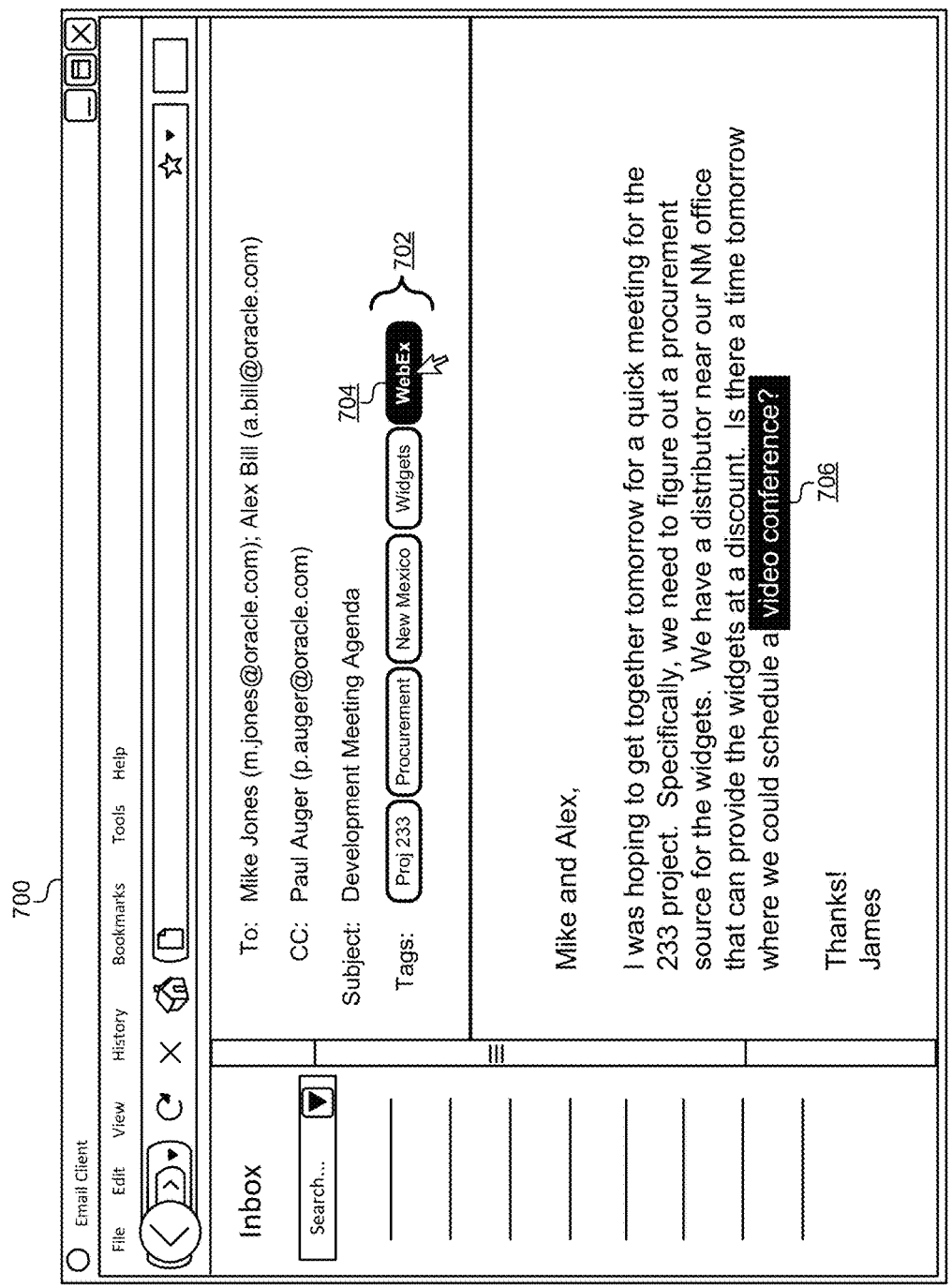
FIG. 7C illustrates how the user interface may be used to view specific text related to specific tags within the email message, according to some embodiments.

FIG. 7C illustrates how the user interface may be used to view specific text related to specific tags within the email message, according to some embodiments. Recall above that the sender and/or the tag prediction server may assign tags that are generally applicable to the email message. The sender and/or the tag prediction server may also assign tags that are specifically applicable to text selections within the email message. In the example of FIG. 2D the "WebEx" tag was added by the sending user to be specifically applicable to the text selection of "video conference." To see this relationship, the receiving user may select the WebEx tag 704 using an input device, such as a mouse, a finger tap, and/or the like. Once the tag 704 is selected, the interface 702 may automatically highlight the corresponding text selection 706. This allows the user to select each of the tags 702 in order to visually identify any selected text in the email message that is specifically tied to those tags.

As described above, the corresponding text selection 706 may be assigned manually by a user sending and/or receiving the email message. However, some embodiments may assign the selected text 706 to the corresponding tag 704 automatically using the tag prediction model. As described in greater detail below, the tag prediction model may include an operation that generates an attention vector that characterizes the contribution of each word or phrase when assigning the confidence score to each available tag. The attention vector may be analyzed for each tag predicted by the tag prediction model to assign a particular text selection to each tag. In this example, the user may select the WebEx tag 704, and the selected text illustrated in FIG. 7C may be highlighted as an automatic selection made by the tag prediction model rather than a selection made manually by a user.

Figure 8:
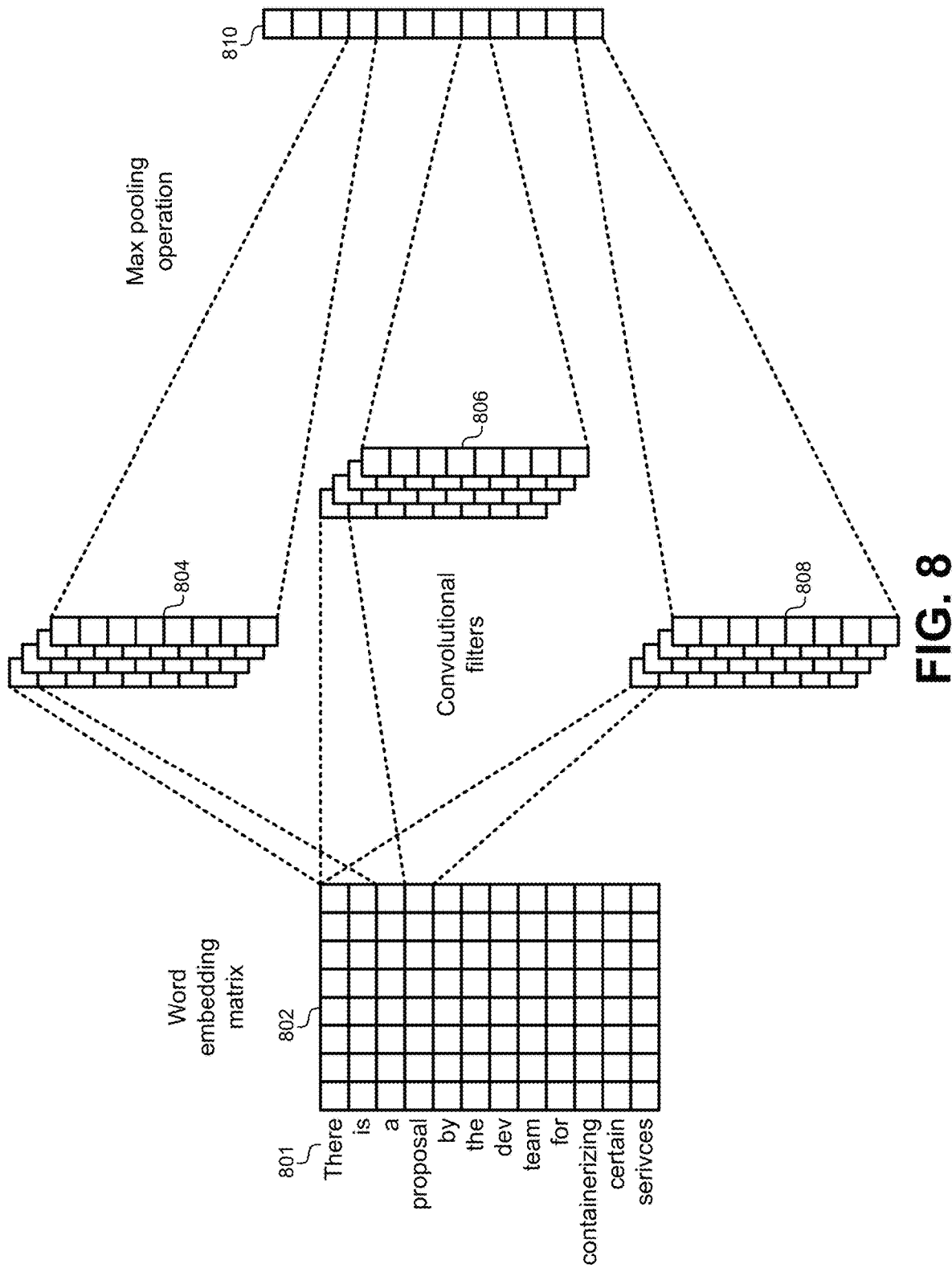
FIG. 8 illustrates a diagram illustrating how the tag prediction model generates a set of confidence scores for the available tags based on input email information, according to some embodiments.

FIG. 8 illustrates a diagram illustrating how the tag prediction model generates a set of confidence scores for the available tags based on input email information, according to some embodiments. The tag prediction model may use a convolution neural network. This neural network may be thought of as a function that receives a block of text as an input and generates a score for each of the available tags in an output vector. In this example, the text 801 provided to the neural network may include the phrase "there is a proposal by the dev team for containerizing certain services." Note that this is a simplified example, and real-world examples may use much longer text blocks that may typically be found in an email message. Also assume that there are Tn available tags in the system for this particular user group. The available tag database may be built by recognizing and recording any tags provided to the system either by an administrator or by users. The output of the neural network may be an array of length Tn, where each entry in the array comprises a confidence score that indicates a level to which the associated tag is related to the text. The neural network may view this process as finding a solution to a categorization problem.

Before processing the text through the neural network, the tag prediction model may convert the text 801 into a two-dimensional (2D) vector, such as a word embedding matrix 802. The word embedding matrix 802 converts the text 801 into a numerical representation that can be understood by the neural network. A word embedding matrix 802 greatly improves the efficiency of the neural network and works just like a fully connected layer. Each word may be mapped to a d-dimensional vector space. The vector space provides a mathematical representation of how closely words in the text 801 are related based on the proximity of the associated vectors in the vector space. For example, words having similar meanings would be oriented in similar directions in the vector space, while words having opposite meanings would be oriented in opposite directions. If there are n words in the input text, then the order of the word embedding matrix 802 would be n×d.

The neural network may also be comprised of a plurality of convolutional filters 804, 806, 808. Each of the convolutional filters 804, 806, 808 may consider a sliding window of text in the word embedding matrix 802. Essentially, each filter may consider a different length n-gram formed by adjacent words in the text 801. In this example, a first filter 804 may have a window length of two words, a second filter 806 may have a window length of three words, and a third filter 808 may have a window length of four words. Note that additional filters may also be used having longer window lengths that are not explicitly illustrated in FIG. 8. Each cell in the convolutional filters 804, 806, 808 may include a value that is multiplied with each value in the corresponding row in the word embedding matrix 802. The multiplication results are accumulated in a convolution operation. For example, a window size of 2 would result in n−1 items in each column of the convolution neural network. Each of the sets of columns depicted in FIG. 8 for the convolutional filters 804, 806, 808 may be considered a matrix of results from the convolution operation for each filter.

After the convolutional filters have operated and generated the resulting matrices, a max pooling operation may be executed to combine the results of the filters. In some embodiments, this operation may examine each element in each of the resulting matrices and identify the largest values from the resulting matrices at each position. This largest value may be accumulated into a final layer 810 of the neural network, which may have a length of 3L, where L is the size of the filters 804, 806, 808.

Figure 9:
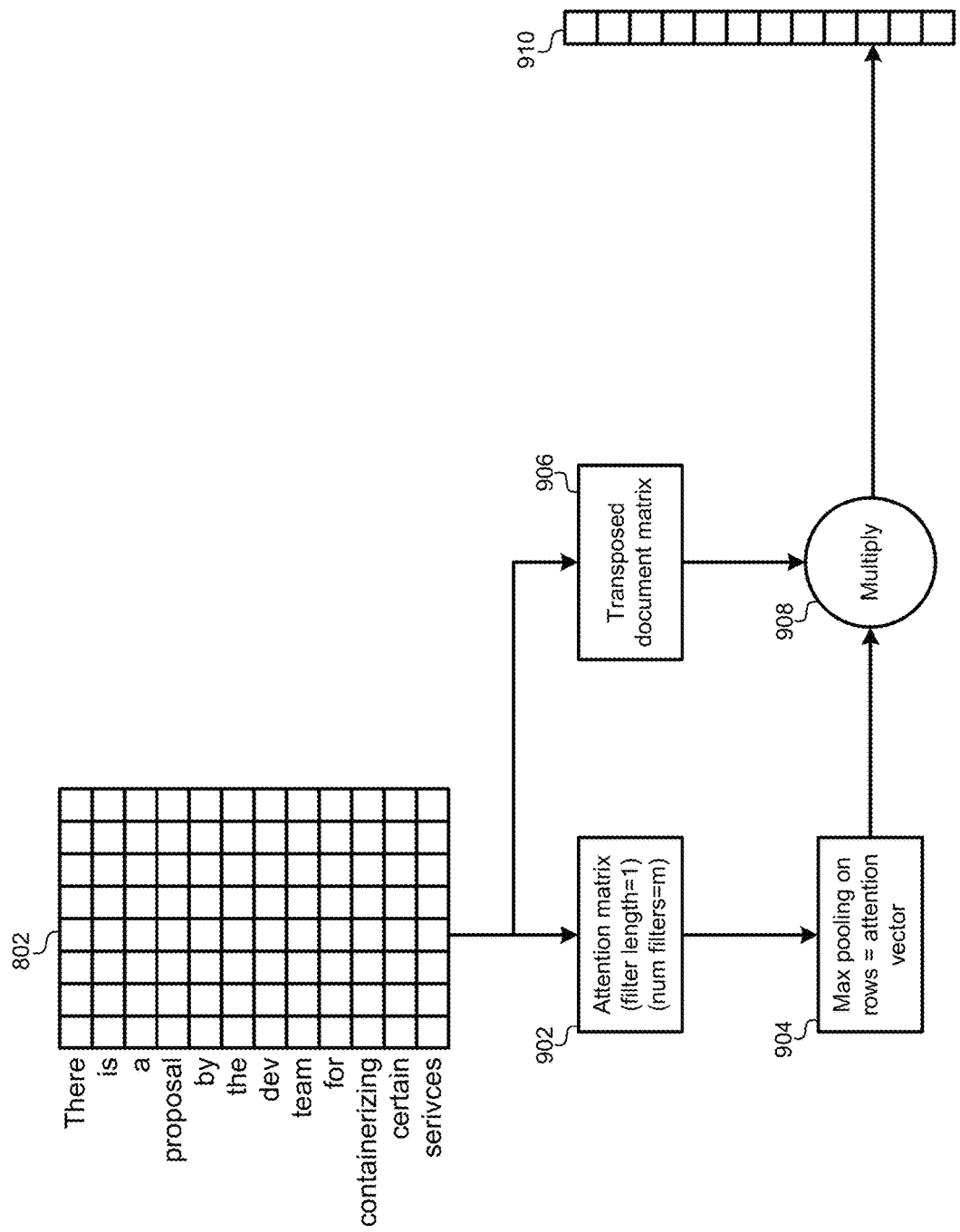
FIG. 9 illustrates a second operation performed by the tag prediction model to generate confidence scores for available tags, according to some embodiments.

FIG. 9 illustrates a second operation performed by the tag prediction model to generate confidence scores for available tags, according to some embodiments. This second operation uses the same word embedding matrix 802 described above. Instead of using convolution filters having window lengths 2, 3, 4, etc., this second operation uses convolution filter(s) having a length of 1. This filter may processes each single word at a time as a 1-gram token. The number of filters used having a length of 1 may be represented by m. The result of the filtering operations may be used to populate a matrix referred to as an "attention matrix" having dimensions of n×m.

Next, a max pooling operation may be performed on the attention matrix to generate an attention vector (904). The max pooling operation may be executed on each row in the attention matrix, identifying the largest value and storing the largest value in the attention vector. The resulting attention matrix has a dimension of n×1. The original word embedding matrix 802 can be transposed (906) such that the original n×d matrix is now a d×n matrix. The resulting transposed word embedding matrix can be multiplied with the attention vector (908) to generate an embedding attention vector 910 having a dimension of d×1.

This attention mechanism allows the model to predict specific text to which each tag may be related. The attention vector represents the relative importance of each word as it corresponds to each of the tag outputs of the tag prediction model. Essentially, the attention vector may include larger values for certain areas of the text that contribute most to each particular tag. Some embodiments may additionally use the attention vector to identify segments of the text that should be related to each particular tag. As described above, some embodiments allow the user to select a tag and see the highlighted text that contributed to the tag. While this text may be set by the user, it may also be automatically predicted by the tag prediction model.

Figure 10:
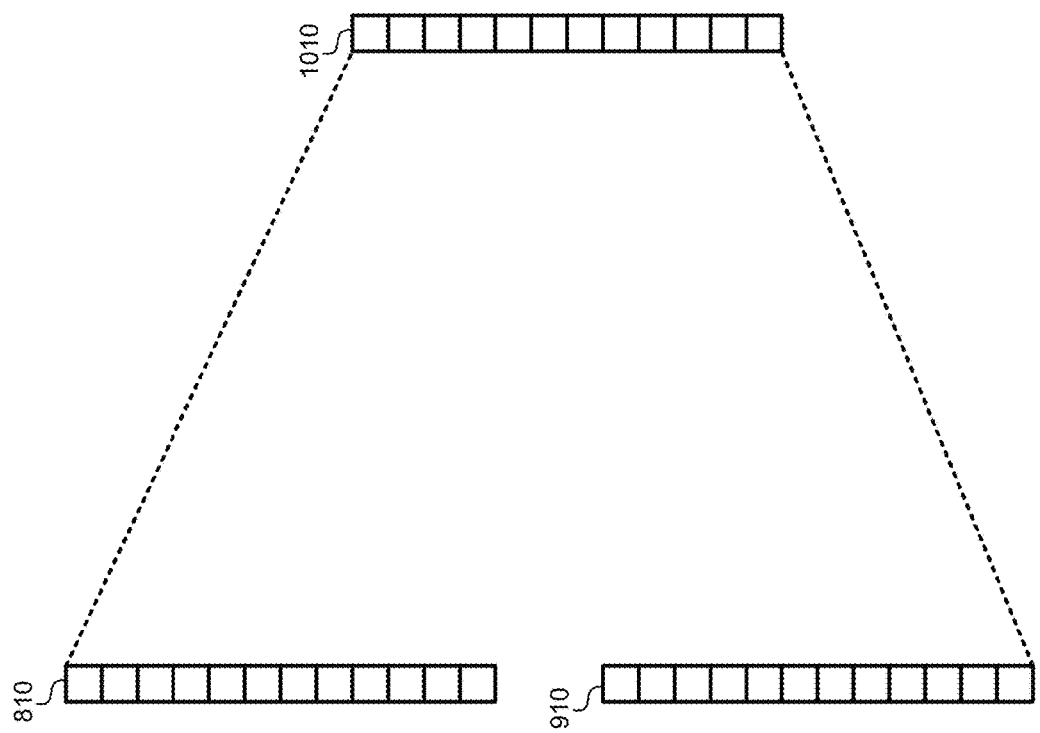
FIG. 10 illustrates how the resulting vectors from the two operations performed by the tag prediction model can be combined into a final result set, according to some embodiments.

FIG. 10 illustrates how the resulting vectors from the two operations performed by the tag prediction model can be combined into a final result set 1010, according to some embodiments. The embedding attention vector 910 having a length of d may be concatenated to the end of the vector from the final layer 810 described in FIG. 8 to form a single vector. This concatenated vector may represent a penultimate layer in the neural network having a length of 3L+d.

The concatenated vector may then be used to form a final layer 1010 in the neural network. Each cell in the final layer 1010 may correspond to a single available tag in the system. Therefore, the final layer 1010 may have a length of Tn corresponding to the available tags. The final layer 1010 may be considered a fully connected layer because each cell in the penultimate concatenated layer will have Tn connections to the final layer 1010. The function for converting the concatenated layer into the final layer 1010 may include multiplying the concatenated vector with a matrix w that includes weight values that are set during the training process. Some embodiments may also add a bias value to each multiplication result. The bias value may also be set through the learning process, and may be initialized to a random value near 0.0. The final vector resulting from this matrix multiplication process is the resulting final layer 1010, and includes a numeric value in each cell representing the confidence score described above.

At a number of different steps in the processes described above, the tags selected and defined by the user may be submitted with the email text as a training pair for the neural network. To train the neural network, the email text may be submitted as an input. Additionally, the values in the final layer 1010 of the neural network may be set according to the selected tags. For tags that are selected as being relevant to the email by the user, the value in the corresponding location of the final layer 1010 may be set to 1.0. All of the unselected (e.g., not relevant) tags may be set to 0.0. The training process may then set the value of the bias, the weights in the matrix described above, and the values for the convolution filters.

Figure 11:
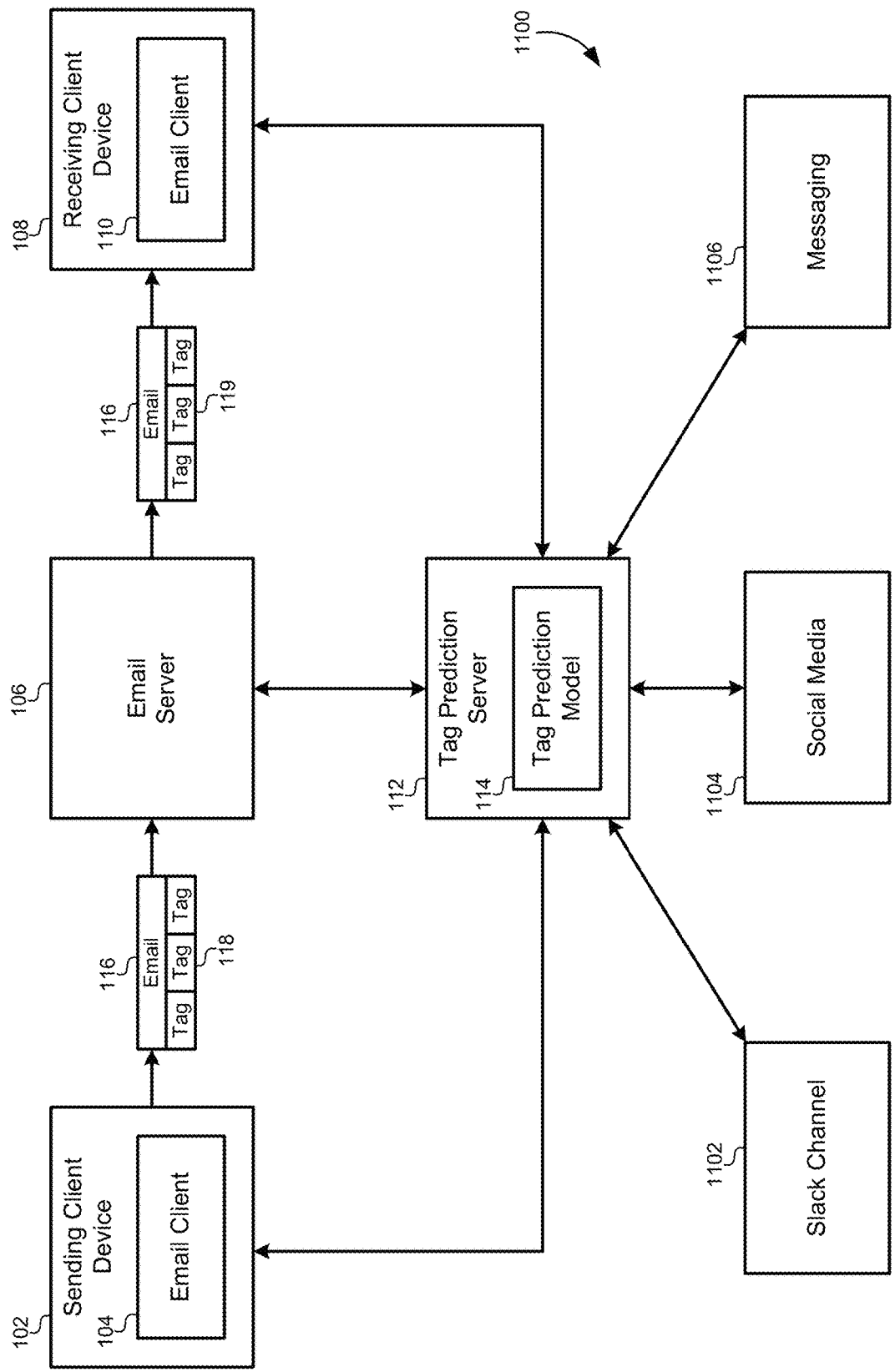
FIG. 11 illustrates an expanded system architecture that includes additional communication channels, according to some embodiments.

FIG. 11 illustrates an expanded system architecture 1100 that includes additional communication channels, according to some embodiments. As described above, the email communication channel is only one example of many different communication channels that may make use of the tag prediction server 112. The same principles, methods, functions, and models described above may be used in conjunction with other communication channels without limitation. Therefore, the entire description above may be equally applicable to social media channels 1104, instant messaging channels 1106, SLACK® channels 1102, and/or any other methods of communication. For example, instead of providing email information to the tag prediction server 112, the other communication channels may provide text bodies representing instant messages, message conversations, threads, comments, and so forth. Each of these text bodies may then receive tags in the same way that email messages receive predicted tags as described above.

Additionally, each of the various communication channels may operate in conjunction with each other using the same set of tags and/or the same tag prediction models. For example, a model may be trained using email messages, instant messages, social media posts, and channel conversations without regard for the particular source. When a user sends an email and refines the tags predicted by the tag prediction model, the model may be trained such that new predicted tags may be provided for instant messages using the same tag prediction model. The database of tags for each user group may be shared between each of these multiple channels together.

Figure 12:
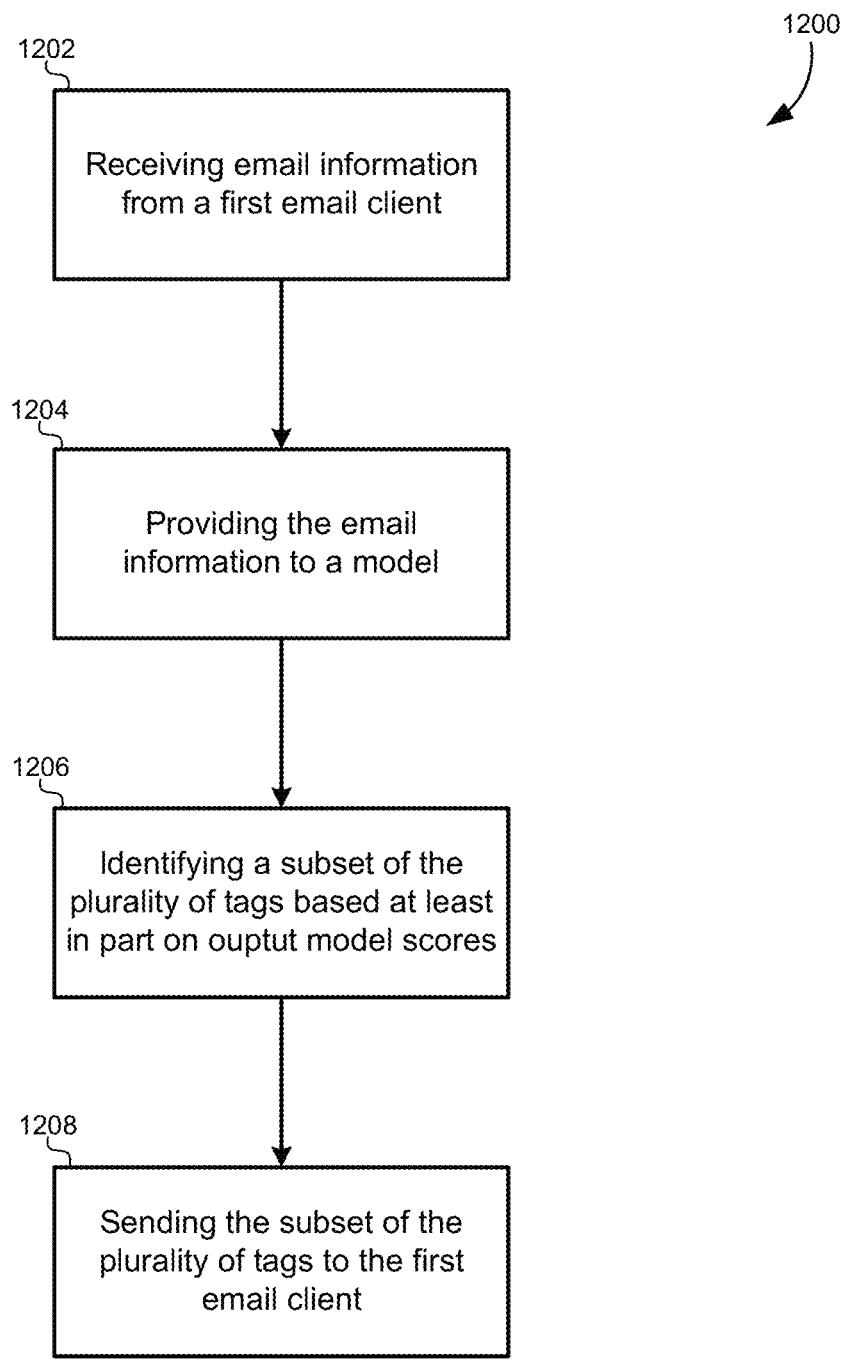
FIG. 12 illustrates a method for tagging emails as they are sent and received through an email system, according to some embodiments.

FIG. 12 illustrates a method for tagging emails as they are sent and received through an email system, according to some embodiments. This method may be carried out using the system described above in FIG. 1. Each of the steps described below has been described in detail in various figures and sections above in this disclosure. Therefore, each of the steps described below may include any of the features related to these steps as described elsewhere herein.

The method may include receiving email information from a first email client (1202). In some embodiments, the email information may be associated with an email message being sent from the first email client to a second email client. The first email client may be a sending email client, and the second email client may be a receiving email client. The email information may include any metadata or descriptive information, such as an email body, a subject line, a header, a recipient list, and so forth. The email may be sent from the first email client to a tag prediction server operating a tag prediction model. The email information may be sent as the email message is being composed and before it is sent from the first email client.

The method may also include providing the email information to a model (1204). The model may generate scores for a plurality of tags. The model may be a convolution neural network with a plurality of filters having varying window sizes as described above in FIGS. 8-11. The tags may be loaded from a set of available tags that are specific to a particular organization, user group, sub organization, or other grouping of users and/or email messages.

The method may additionally include identifying a subset of the plurality of tags based at least in part on the scores (1206). The subset may include the set of predicted tags described above. The scores for the available tags may be compared to a threshold, and tags above the threshold may be used as predicted tags. The subset of the available tags used as predicted tags may be related to ideas or concepts expressed in the email information. The scores may represent a confidence score in the relationship between the corresponding tag and the email message. In some embodiments, the subset of the plurality of tags may also include one or more tags that are associated with specific text selections in the email message. The specific text selections may be identified using an attention vector/matrix as described above in FIG. 10.

The method may further include sending the set of predicted tags to the first email client (1208). These predicted tags may be displayed in a user interface for the user as illustrated above in FIGS. 2A-2D. The user may be allowed to edit, modify, add, remove, and/or otherwise change the predicted tags. For example, the user may remove some of the predicted tags, which may form a group of selected tags and a group of unselected tags from the predicted tags. The user may also add new tags that are not part of the predicted tag list. In some embodiments, tags from the plurality of tags that were not selected as part of the subset may be referenced at the server to perform an auto complete function. Once a final tag list is set by the user, the tags may be embedded as part of the email, such as in an email header. The tags may then be sent with the email to an email server, which may forward the email on to the receiving email client. As described in detail above, the server may optionally retrain the model and/or modify the tag list as the email is passed through the email server and received at the receiving email client.

Each set of tags described above may include any number of tags. Thus, in some cases a set of tags may include a single tag, a plurality of tags, or no tags. The subset of tags may include all of the tags from the parent set. For example, the process may identify all of the available tags as being predicted tags if the scores so dictate.

It should be appreciated that the specific steps illustrated in FIG. 12 provide particular methods of tagging emails as they are sent and received through an email system according to various embodiments. Other sequences of steps may also be performed according to alternative embodiments. For example, alternative embodiments of the present invention may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize many variations, modifications, and alternatives.

Each of the methods described herein may be implemented by a computer system. Each step of these methods may be executed automatically by the computer system, and/or may be provided with inputs/outputs involving a user. For example, a user may provide inputs for each step in a method, and each of these inputs may be in response to a specific output requesting such an input, wherein the output is generated by the computer system. Each input may be received in response to a corresponding requesting output.

Furthermore, inputs may be received from a user, from another computer system as a data stream, retrieved from a memory location, retrieved over a network, requested from a web service, and/or the like. Likewise, outputs may be provided to a user, to another computer system as a data stream, saved in a memory location, sent over a network, provided to a web service, and/or the like. In short, each step of the methods described herein may be performed by a computer system, and may involve any number of inputs, outputs, and/or requests to and from the computer system which may or may not involve a user. Those steps not involving a user may be said to be performed automatically by the computer system without human intervention. Therefore, it will be understood in light of this disclosure, that each step of each method described herein may be altered to include an input and output to and from a user, or may be done automatically by a computer system without human intervention where any determinations are made by a processor. Furthermore, some embodiments of each of the methods described herein may be implemented as a set of instructions stored on a tangible, non-transitory storage medium to form a tangible software product.

Figure 13:
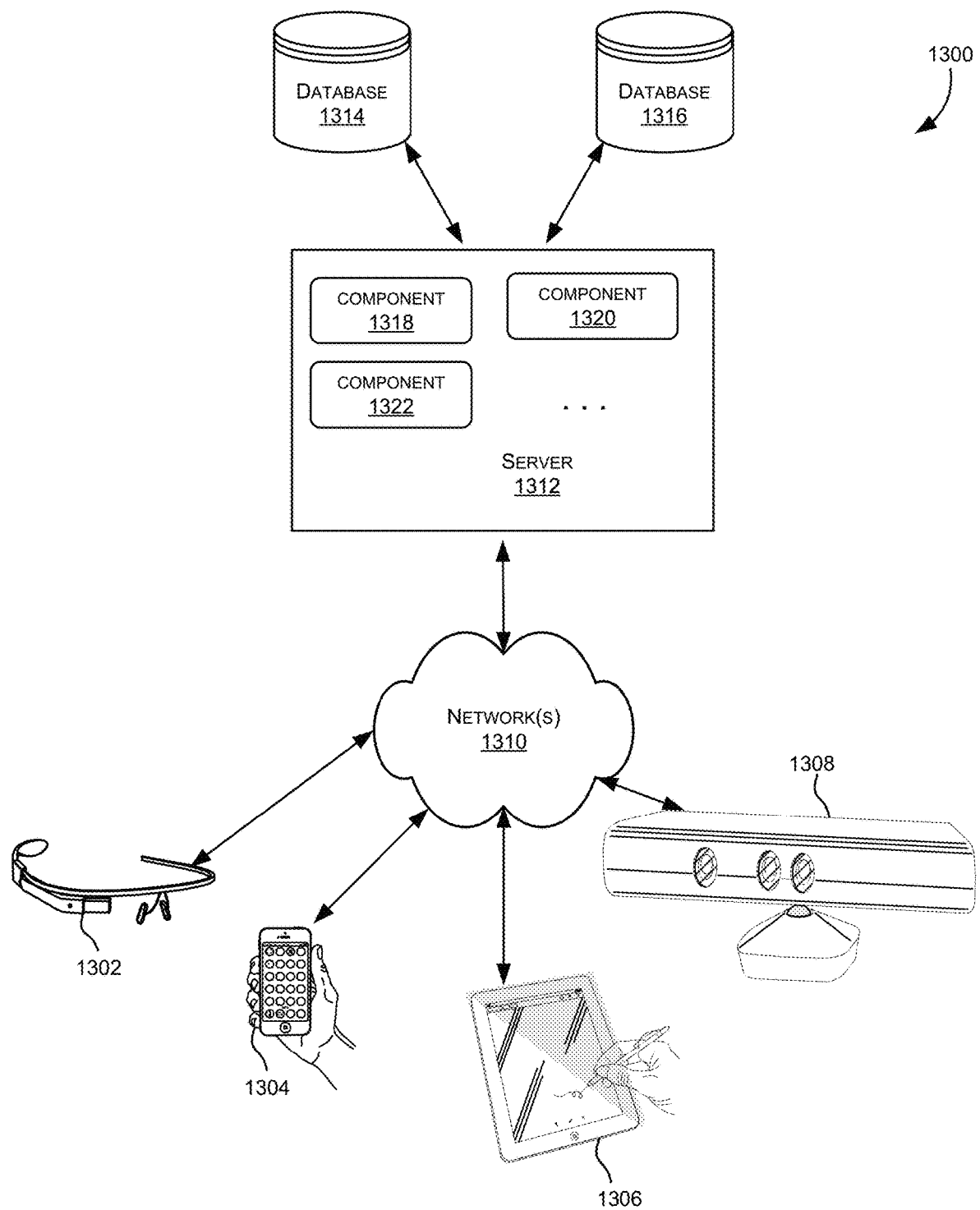
FIG. 13 illustrates a simplified block diagram of a distributed system for implementing some of the embodiments.

FIG. 13 depicts a simplified diagram of a distributed system 1300 for implementing one of the embodiments. In the illustrated embodiment, distributed system 1300 includes one or more client computing devices 1302, 1304, 1306, and 1308, which are configured to execute and operate a client application such as a web browser, proprietary client (e.g., Oracle Forms), or the like over one or more network(s) 1310. Server 1312 may be communicatively coupled with remote client computing devices 1302, 1304, 1306, and 1308 via network 1310.

In various embodiments, server 1312 may be adapted to run one or more services or software applications provided by one or more of the components of the system. In some embodiments, these services may be offered as web-based or cloud services or under a Software as a Service (SaaS) model to the users of client computing devices 1302, 1304, 1306, and/or 1308. Users operating client computing devices 1302, 1304, 1306, and/or 1308 may in turn utilize one or more client applications to interact with server 1312 to utilize the services provided by these components.

In the configuration depicted in the figure, the software components 1318, 1320 and 1322 of system 1300 are shown as being implemented on server 1312. In other embodiments, one or more of the components of system 1300 and/or the services provided by these components may also be implemented by one or more of the client computing devices 1302, 1304, 1306, and/or 1308. Users operating the client computing devices may then utilize one or more client applications to use the services provided by these components. These components may be implemented in hardware, firmware, software, or combinations thereof. It should be appreciated that various different system configurations are possible, which may be different from distributed system 1300. The embodiment shown in the figure is thus one example of a distributed system for implementing an embodiment system and is not intended to be limiting.

Client computing devices 1302, 1304, 1306, and/or 1308 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 1302, 1304, 1306, and 1308 may be any other electronic device, such as a thin-client computer, an Internet-enabled gaming system (e.g., a Microsoft Xbox gaming console with or without a Kinect® gesture input device), and/or a personal messaging device, capable of communicating over network(s) 1310.

Although exemplary distributed system 1300 is shown with four client computing devices, any number of client computing devices may be supported. Other devices, such as devices with sensors, etc., may interact with server 1312.

Network(s) 1310 in distributed system 1300 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 1310 can be a local area network (LAN), such as one based on Ethernet, Token-Ring and/or the like. Network(s) 1310 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 1312 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 1312 may be adapted to run one or more services or software applications described in the foregoing disclosure. For example, server 1312 may correspond to a server for performing processing described above according to an embodiment of the present disclosure.

Server 1312 may run an operating system including any of those discussed above, as well as any commercially available server operating system. Server 1312 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1312 may include one or more applications to analyze and consolidate data feeds and/or event updates received from users of client computing devices 1302, 1304, 1306, and 1308. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1312 may also include one or more applications to display the data feeds and/or real-time events via one or more display devices of client computing devices 1302, 1304, 1306, and 1308.

Distributed system 1300 may also include one or more databases 1314 and 1316. Databases 1314 and 1316 may reside in a variety of locations. By way of example, one or more of databases 1314 and 1316 may reside on a non-transitory storage medium local to (and/or resident in) server 1312. Alternatively, databases 1314 and 1316 may be remote from server 1312 and in communication with server 1312 via a network-based or dedicated connection. In one set of embodiments, databases 1314 and 1316 may reside in a storage-area network (SAN). Similarly, any necessary files for performing the functions attributed to server 1312 may be stored locally on server 1312 and/or remotely, as appropriate. In one set of embodiments, databases 1314 and 1316 may include relational databases, such as databases provided by Oracle, that are adapted to store, update, and retrieve data in response to SQL-formatted commands.

Figure 14:
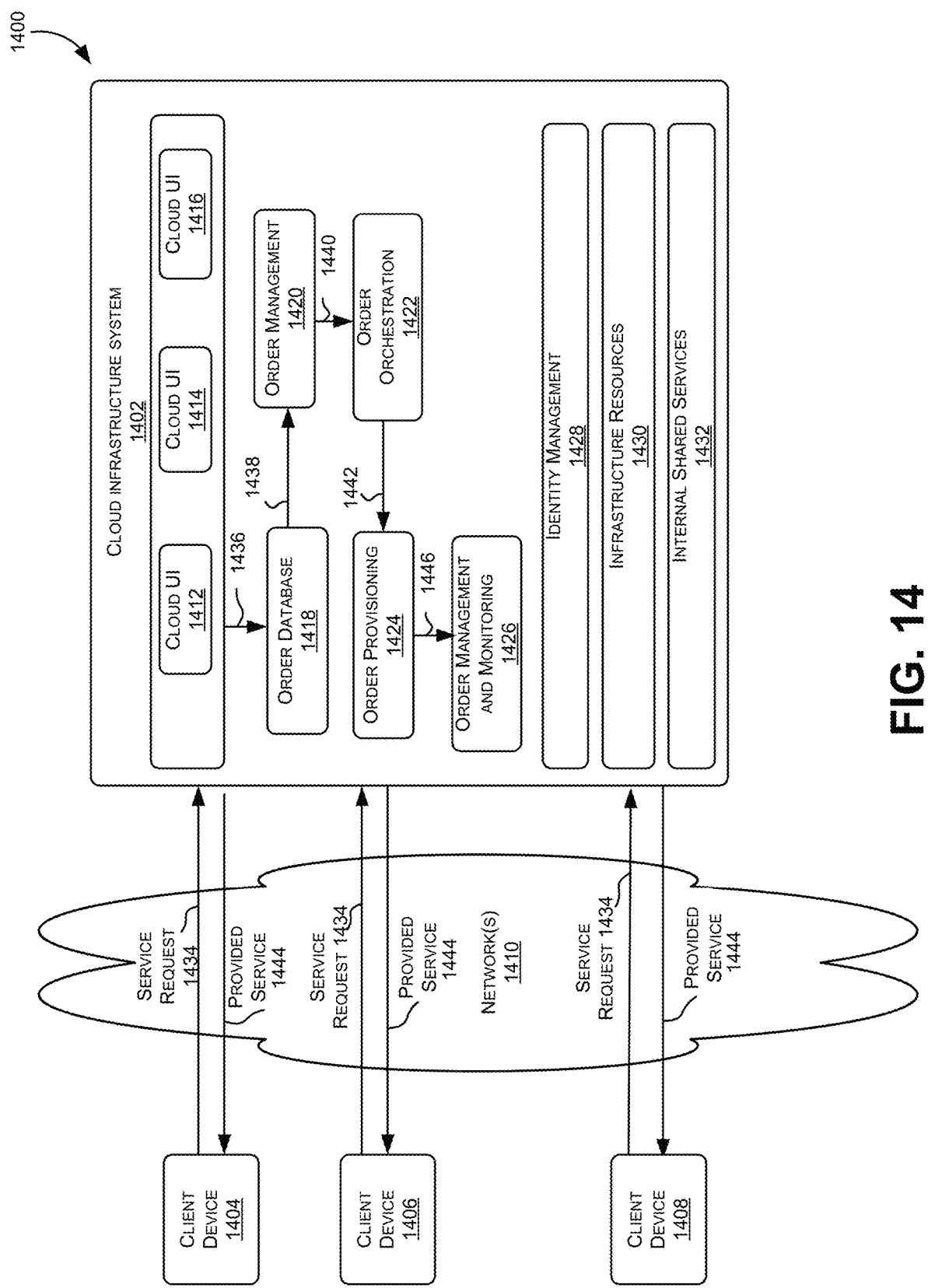
FIG. 14 illustrates a simplified block diagram of components of a system environment by which services provided by the components of an embodiment system may be offered as cloud services.

FIG. 14 is a simplified block diagram of one or more components of a system environment 1400 by which services provided by one or more components of an embodiment system may be offered as cloud services, in accordance with an embodiment of the present disclosure. In the illustrated embodiment, system environment 1400 includes one or more client computing devices 1404, 1406, and 1408 that may be used by users to interact with a cloud infrastructure system 1402 that provides cloud services. The client computing devices may be configured to operate a client application such as a web browser, a proprietary client application (e.g., Oracle Forms), or some other application, which may be used by a user of the client computing device to interact with cloud infrastructure system 1402 to use services provided by cloud infrastructure system 1402.

It should be appreciated that cloud infrastructure system 1402 depicted in the figure may have other components than those depicted. Further, the embodiment shown in the figure is only one example of a cloud infrastructure system that may incorporate an embodiment of the invention. In some other embodiments, cloud infrastructure system 1402 may have more or fewer components than shown in the figure, may combine two or more components, or may have a different configuration or arrangement of components.

Client computing devices 1404, 1406, and 1408 may be devices similar to those described above for 1302, 1304, 1306, and 1308.

Although exemplary system environment 1400 is shown with three client computing devices, any number of client computing devices may be supported. Other devices such as devices with sensors, etc. may interact with cloud infrastructure system 1402.

Network(s) 1410 may facilitate communications and exchange of data between clients 1404, 1406, and 1408 and cloud infrastructure system 1402. Each network may be any type of network familiar to those skilled in the art that can support data communications using any of a variety of commercially-available protocols, including those described above for network(s) 1310.

Cloud infrastructure system 1402 may comprise one or more computers and/or servers that may include those described above for server 1312.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1402 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1402 may be adapted to automatically provision, manage and track a customer's subscription to services offered by cloud infrastructure system 1402. Cloud infrastructure system 1402 may provide the cloud services via different deployment models. For example, services may be provided under a public cloud model in which cloud infrastructure system 1402 is owned by an organization selling cloud services (e.g., owned by Oracle) and the services are made available to the general public or different industry enterprises. As another example, services may be provided under a private cloud model in which cloud infrastructure system 1402 is operated solely for a single organization and may provide services for one or more entities within the organization. The cloud services may also be provided under a community cloud model in which cloud infrastructure system 1402 and the services provided by cloud infrastructure system 1402 are shared by several organizations in a related community. The cloud services may also be provided under a hybrid cloud model, which is a combination of two or more different models.

In some embodiments, the services provided by cloud infrastructure system 1402 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1402. Cloud infrastructure system 1402 then performs processing to provide the services in the customer's subscription order.

In some embodiments, the services provided by cloud infrastructure system 1402 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1402 may also include infrastructure resources 1430 for providing the resources used to provide various services to customers of the cloud infrastructure system. In one embodiment, infrastructure resources 1430 may include pre-integrated and optimized combinations of hardware, such as servers, storage, and networking resources to execute the services provided by the PaaS platform and the SaaS platform.

In some embodiments, resources in cloud infrastructure system 1402 may be shared by multiple users and dynamically re-allocated per demand. Additionally, resources may be allocated to users in different time zones. For example, cloud infrastructure system 1430 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1432 may be provided that are shared by different components or modules of cloud infrastructure system 1402 and by the services provided by cloud infrastructure system 1402. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1402 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1402, and the like.

In one embodiment, as depicted in the figure, cloud management functionality may be provided by one or more modules, such as an order management module 1420, an order orchestration module 1422, an order provisioning module 1424, an order management and monitoring module 1426, and an identity management module 1428. These modules may include or be provided using one or more computers and/or servers, which may be general purpose computers, specialized server computers, server farms, server clusters, or any other appropriate arrangement and/or combination.

In exemplary operation 1434, a customer using a client device, such as client device 1404, 1406 or 1408, may interact with cloud infrastructure system 1402 by requesting one or more services provided by cloud infrastructure system 1402 and placing an order for a subscription for one or more services offered by cloud infrastructure system 1402. In certain embodiments, the customer may access a cloud User Interface (UI), cloud UI 1412, cloud UI 1414 and/or cloud UI 1416 and place a subscription order via these UIs. The order information received by cloud infrastructure system 1402 in response to the customer placing an order may include information identifying the customer and one or more services offered by the cloud infrastructure system 1402 that the customer intends to subscribe to.

After an order has been placed by the customer, the order information is received via the cloud UIs, 1412, 1414 and/or 1416.

At operation 1436, the order is stored in order database 1418. Order database 1418 can be one of several databases operated by cloud infrastructure system 1418 and operated in conjunction with other system elements.

At operation 1438, the order information is forwarded to an order management module 1420. In some instances, order management module 1420 may be configured to perform billing and accounting functions related to the order, such as verifying the order, and upon verification, booking the order.

At operation 1440, information regarding the order is communicated to an order orchestration module 1422. Order orchestration module 1422 may utilize the order information to orchestrate the provisioning of services and resources for the order placed by the customer. In some instances, order orchestration module 1422 may orchestrate the provisioning of resources to support the subscribed services using the services of order provisioning module 1424.

In certain embodiments, order orchestration module 1422 enables the management of business processes associated with each order and applies business logic to determine whether an order should proceed to provisioning. At operation 1442, upon receiving an order for a new subscription, order orchestration module 1422 sends a request to order provisioning module 1424 to allocate resources and configure those resources needed to fulfill the subscription order. Order provisioning module 1424 enables the allocation of resources for the services ordered by the customer. Order provisioning module 1424 provides a level of abstraction between the cloud services provided by cloud infrastructure system 1400 and the physical implementation layer that is used to provision the resources for providing the requested services. Order orchestration module 1422 may thus be isolated from implementation details, such as whether or not services and resources are actually provisioned on the fly or pre-provisioned and only allocated/assigned upon request.

At operation 1444, once the services and resources are provisioned, a notification of the provided service may be sent to customers on client devices 1404, 1406 and/or 1408 by order provisioning module 1424 of cloud infrastructure system 1402.

At operation 1446, the customer's subscription order may be managed and tracked by an order management and monitoring module 1426. In some instances, order management and monitoring module 1426 may be configured to collect usage statistics for the services in the subscription order, such as the amount of storage used, the amount data transferred, the number of users, and the amount of system up time and system down time.

In certain embodiments, cloud infrastructure system 1400 may include an identity management module 1428. Identity management module 1428 may be configured to provide identity services, such as access management and authorization services in cloud infrastructure system 1400. In some embodiments, identity management module 1428 may control information about customers who wish to utilize the services provided by cloud infrastructure system 1402. Such information can include information that authenticates the identities of such customers and information that describes which actions those customers are authorized to perform relative to various system resources (e.g., files, directories, applications, communication ports, memory segments, etc.) Identity management module 1428 may also include the management of descriptive information about each customer and about how and by whom that descriptive information can be accessed and modified.

Figure 15:
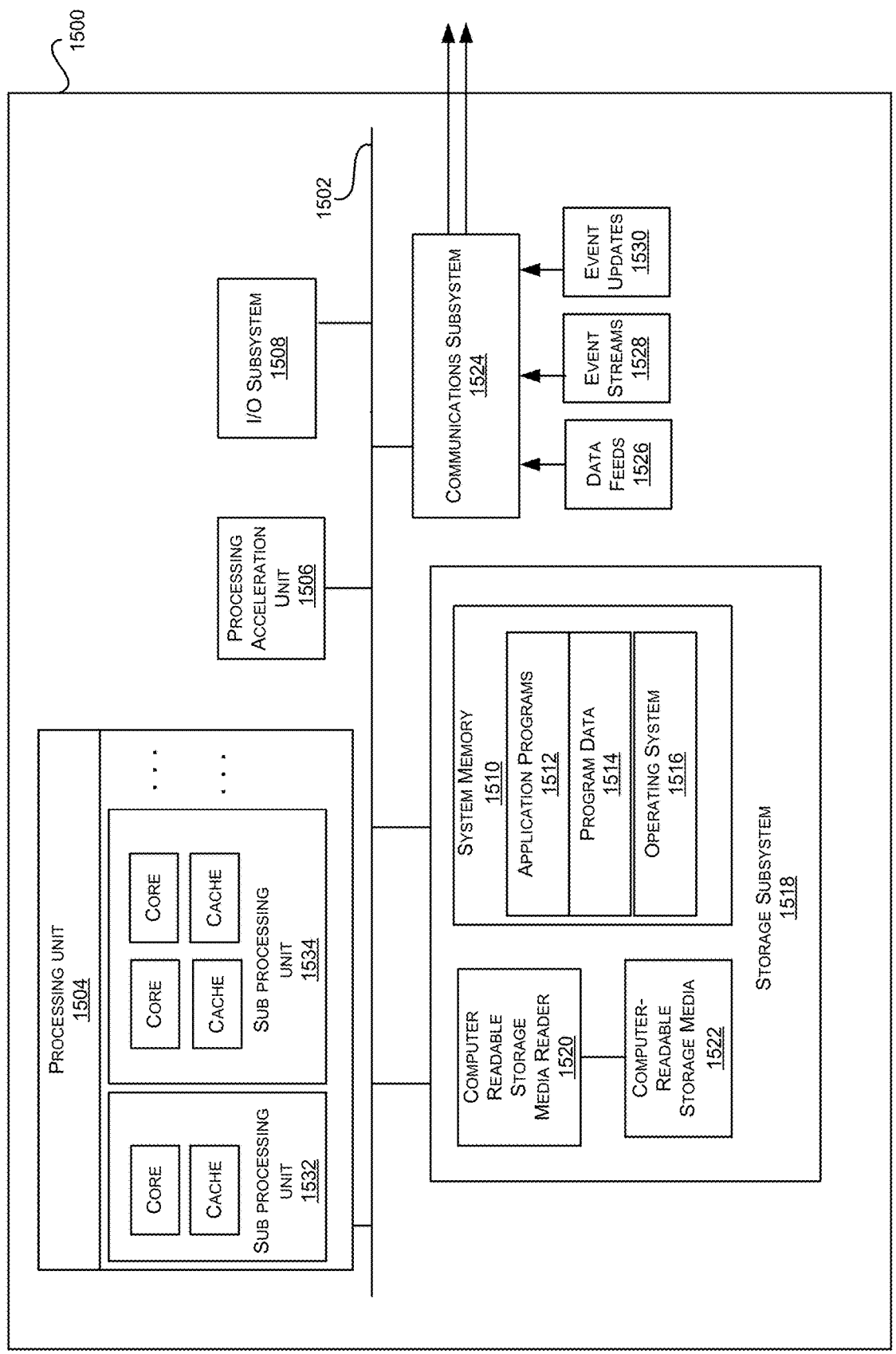
FIG. 15 illustrates an exemplary computer system, in which various embodiments may be implemented.

FIG. 15 illustrates an exemplary computer system 1500, in which various embodiments of the present invention may be implemented. The system 1500 may be used to implement any of the computer systems described above. As shown in the figure, computer system 1500 includes a processing unit 1504 that communicates with a number of peripheral subsystems via a bus subsystem 1502. These peripheral subsystems may include a processing acceleration unit 1506, an I/O subsystem 1508, a storage subsystem 1518 and a communications subsystem 1524. Storage subsystem 1518 includes tangible computer-readable storage media 1522 and a system memory 1510.

Bus subsystem 1502 provides a mechanism for letting the various components and subsystems of computer system 1500 communicate with each other as intended. Although bus subsystem 1502 is shown schematically as a single bus, alternative embodiments of the bus subsystem may utilize multiple buses. Bus subsystem 1502 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1504, which can be implemented as one or more integrated circuits (e.g., a conventional microprocessor or microcontroller), controls the operation of computer system 1500. One or more processors may be included in processing unit 1504. These processors may include single core or multicore processors. In certain embodiments, processing unit 1504 may be implemented as one or more independent processing units 1532 and/or 1534 with single or multicore processors included in each processing unit. In other embodiments, processing unit 1504 may also be implemented as a quad-core processing unit formed by integrating two dual-core processors into a single chip.

In various embodiments, processing unit 1504 can execute a variety of programs in response to program code and can maintain multiple concurrently executing programs or processes. At any given time, some or all of the program code to be executed can be resident in processor(s) 1504 and/or in storage subsystem 1518. Through suitable programming, processor(s) 1504 can provide various functionalities described above. Computer system 1500 may additionally include a processing acceleration unit 1506, which can include a digital signal processor (DSP), a special-purpose processor, and/or the like.

I/O subsystem 1508 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1500 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1500 may comprise a storage subsystem 1518 that comprises software elements, shown as being currently located within a system memory 1510. System memory 1510 may store program instructions that are loadable and executable on processing unit 1504, as well as data generated during the execution of these programs.

Depending on the configuration and type of computer system 1500, system memory 1510 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1504. In some implementations, system memory 1510 may include multiple different types of memory, such as static random access memory (SRAM) or dynamic random access memory (DRAM). In some implementations, a basic input/output system (BIOS), containing the basic routines that help to transfer information between elements within computer system 1500, such as during start-up, may typically be stored in the ROM. By way of example, and not limitation, system memory 1510 also illustrates application programs 1512, which may include client applications, Web browsers, mid-tier applications, relational database management systems (RDBMS), etc., program data 1514, and an operating system 1516. By way of example, operating system 1516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1518 may also provide a tangible computer-readable storage medium for storing the basic programming and data constructs that provide the functionality of some embodiments. Software (programs, code modules, instructions) that when executed by a processor provide the functionality described above may be stored in storage subsystem 1518. These software modules or instructions may be executed by processing unit 1504. Storage subsystem 1518 may also provide a repository for storing data used in accordance with the present invention.

Storage subsystem 1500 may also include a computer-readable storage media reader 1520 that can further be connected to computer-readable storage media 1522. Together and, optionally, in combination with system memory 1510, computer-readable storage media 1522 may comprehensively represent remote, local, fixed, and/or removable storage devices plus storage media for temporarily and/or more permanently containing, storing, transmitting, and retrieving computer-readable information.

Computer-readable storage media 1522 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1500.

By way of example, computer-readable storage media 1522 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1522 may include, but is not limited to, Zip® drives, flash memory cards, universal serial bus (USB) flash drives, secure digital (SD) cards, DVD disks, digital video tape, and the like. Computer-readable storage media 1522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1500.

Communications subsystem 1524 provides an interface to other computer systems and networks. Communications subsystem 1524 serves as an interface for receiving data from and transmitting data to other systems from computer system 1500. For example, communications subsystem 1524 may enable computer system 1500 to connect to one or more devices via the Internet. In some embodiments communications subsystem 1524 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1524 can provide wired network connectivity (e.g., Ethernet) in addition to or instead of a wireless interface.

In some embodiments, communications subsystem 1524 may also receive input communication in the form of structured and/or unstructured data feeds 1526, event streams 1528, event updates 1530, and the like on behalf of one or more users who may use computer system 1500.

By way of example, communications subsystem 1524 may be configured to receive data feeds 1526 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1524 may also be configured to receive data in the form of continuous data streams, which may include event streams 1528 of real-time events and/or event updates 1530, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1524 may also be configured to output the structured and/or unstructured data feeds 1526, event streams 1528, event updates 1530, and the like to one or more databases that may be in communication with one or more streaming data source computers coupled to computer system 1500.

Computer system 1500 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1500 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of explanation, numerous specific details were set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The foregoing description provides exemplary embodiments only, and is not intended to limit the scope, applicability, or configuration of the disclosure. Rather, the foregoing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the foregoing description to provide a thorough understanding of the embodiments. However, it will be understood by one of ordinary skill in the art that the embodiments may be practiced without these specific details. For example, circuits, systems, networks, processes, and other components may have been shown as components in block diagram form in order not to obscure the embodiments in unnecessary detail. In other instances, well-known circuits, processes, algorithms, structures, and techniques may have been shown without unnecessary detail in order to avoid obscuring the embodiments.

Also, it is noted that individual embodiments may have been described as a process which is depicted as a flowchart, a flow diagram, a data flow diagram, a structure diagram, or a block diagram. Although a flowchart may have described the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to portable or fixed storage devices, optical storage devices, wireless channels and various other mediums capable of storing, containing, or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

Additionally, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

What is claimed is:

1. A non-transitory computer-readable medium comprising instructions that, when executed by one or more processors, cause the one or more processors to perform operations comprising:
   receiving email information from a first email client, wherein the email information is associated with an email message to be sent from the first email client to a second email client;
   generating a set of predicted tags from a set of available tags for the email message using a model;
   sending, by the email server, the set of predicted tags to the first email client to be appended to the email message;
   receiving the email message, a set of user tags, a set of unselected tags, and a set of selected tags from the first email client as the email message is sent to the second email client, wherein:
   the set of selected tags were selected from the set of predicted tags by a user;
   the set of unselected tags were not selected by from the set of predicted tags; and the set of user tags were provided by the user instead of being selected from the set of predicted tags; and
   retraining the model based on the set of selected tags, the set of unselected tags, and the set of user tags.

2. The non-transitory computer-readable medium of claim 1, wherein the operations further comprise:
   providing the email information to the model, wherein the model generates scores for the set of available tags; and
   identifying the set of predicted tags as a subset of the set of available tags based at least in part on the scores.

3. The non-transitory computer-readable medium of claim 1, wherein the set of selected tags is embedded in a header of the email message when it is sent to the second email client.

4. The non-transitory computer-readable medium of claim 1, wherein the operations further comprise:
   receiving a request from the first email client comprising a prefix of a new tag being received from a user;
   identifying a set of auto complete tags in the set of available tags that begin with the prefix; and
   sending the set of auto complete tags to the first email client.

5. The non-transitory computer-readable medium of claim 1, wherein the first email client is configured to generate a user interface that includes a display of an email header that includes the set of predicted tags.

6. The non-transitory computer-readable medium of claim 1, wherein the operations further comprise generating a hash key based on the email information, wherein the hash key uniquely identifies the email message.

7. The non-transitory computer-readable medium of claim 6, wherein the operations further comprise storing the hash key in a hash map of hash keys, wherein each of the hash keys in the hash map references a data structure representing a subset of the set of available tags that are not part of the set of predicted tags.

8. The non-transitory computer-readable medium of claim 7, wherein the data structure comprises a weighted trie of prefixes.

9. The non-transitory computer-readable medium of claim 7, wherein the operations further comprise:
   receiving a prefix and the email information from the first email client;
   re-generating the hash key using the email information;
   using the hash key to reference a data structure for the email message; and
   retrieving one or more tags in the set of available tags from the data structure that complete the prefix.

10. The non-transitory computer-readable medium of claim 1, wherein the operations further comprise receiving the set of selected tags from an email server through which the email message is transmitted.

11. The non-transitory computer-readable medium of claim 10, wherein the operations further comprise receiving a set of user tags from the email server that are different from the set of selected tags.

12. The non-transitory computer-readable medium of claim 1, wherein the model is selected from a plurality of models, wherein each of the plurality of models is assigned to a different user group.

13. The non-transitory computer-readable medium of claim 12, wherein each different user group corresponds to a predefined mailing list.

14. The non-transitory computer-readable medium of claim 1, wherein the operations further comprise:
   receiving second email information from an email server through which a second email message is transmitted from the first email client;
   providing the second email information to the model to identify a second set of predicted tags from the set of available tags; and
   sending the second set of predicted tags to the email server, wherein the second set of predicted tags are sent with the second email message to the second email client.

15. The non-transitory computer-readable medium of claim 1, wherein the operations further comprise:
   receiving changes to the set of selected tags or new user tags from the second email client after the second email client receives the email message; and
   retraining the model using the email information and the changes to the set of selected tags or the new user tags from the second email client.

16. The non-transitory computer-readable medium of claim 1, wherein the model comprises:
   a word embedding matrix populated using the email information;
   a plurality of convolutional filters having different window sizes; and
   a max pooling operation using results from the plurality of convolution filters.

17. A method of automatically generating end-to-end email tags in an email system, the method comprising:
   receiving email information from a first email client, wherein the email information is associated with an email message to be sent from the first email client to a second email client;
   generating a set of predicted tags from a set of available tags for the email message using a model;
   sending, by the email server, the set of predicted tags to the first email client to be appended to the email message;

receiving the email message, a set of user tags, a set of unselected tags, and a set of selected tags from the first email client as the email message is sent to the second email client, wherein: the set of selected tags were selected from the set of predicted tags by a user; the set of unselected tags were not selected by from the set of predicted tags; and the set of user tags were provided by the user instead of being selected from the set of predicted tags; and retraining the model based on the set of selected tags, the set of unselected tags, and the set of user tags.

18. A system comprising:

one or more processors; and one or more memory devices comprising instructions that, when executed by the one or more processors, cause the one or more processors to perform operations comprising:

receiving email information from a first email client, wherein the email information is associated with an email message to be sent from the first email client to a second email client;

generating a set of predicted tags from a set of available tags for the email message using a model;

sending, by the email server, the set of predicted tags to the first email client to be appended to the email message;

receiving the email message, a set of user tags, a set of unselected tags, and a set of selected tags from the first email client as the email message is sent to the second email client, wherein: the set of selected tags were selected from the set of predicted tags by a user;

the set of unselected tags were not slected by from the set of predicted tags; and the set of user tags were provided by the user instead of being selected from the set of predicted tags; and retraining the model based on the set of selected tags, the set of unselected tags, and the set of user tags.

* * * * *

UNITED STATES PATENT AND TRADEMARK OFFICE
CERTIFICATE OF CORRECTION

PATENT NO. : 12,224,974 B2  
APPLICATION NO. : 17/403596  
DATED : February 11, 2025  
INVENTOR(S) : Nizar et al.

Page 1 of 1

It is certified that error appears in the above-identified patent and that said Letters Patent is hereby corrected as shown below:

In the Drawings

On sheet 13 of 20, in FIG. 8, under reference numeral 801, Line 12, delete "serivces" and insert -- services --, therefor.

On sheet 14 of 20, in FIG. 9, under reference numeral 802, Line 12, delete "serivces" and insert -- services --, therefor.

In the Claims

In Column 34, Line 13, in Claim 18, delete "slected" and insert -- selected --, therefor.

Signed and Sealed this  
Sixth Day of May, 2025

Coke Morgan Stewart  
*Acting Director of the United States Patent and Trademark Office*